(12) United States Patent
Oliver

(10) Patent No.: US 12,741,515 B2
(45) Date of Patent: Sep. 22, 2026

(54) TRANSFORMABLE PASSENGER TRANSPORT CAPSULE AND CAB PASS-THROUGH SYSTEM FOR PICKUP TRUCKS

(71) Applicant: Eric A. Oliver, Spring Branch, TX (US)

(72) Inventor: Eric A. Oliver, Spring Branch, TX (US)

( * ) Notice: Subject to any disclaimer, the term of this patent is extended or adjusted under 35 U.S.C. 154(b) by 0 days.

(21) Appl. No.: 19/553,255

(22) Filed: Feb. 28, 2026

(65) Prior Publication Data

US 2026/0217096 A1 Jul. 30, 2026

Related U.S. Application Data

(63) Continuation of application No. 19/463,289, filed on Jan. 29, 2026.

(Continued)

(51) Int. Cl.
*B60J 5/10* (2006.01)
*B60J 7/16* (2006.01)

(52) U.S. Cl.
CPC ............ *B60J 5/108* (2013.01); *B60J 7/1607* (2013.01)

(58) Field of Classification Search
CPC ...... B62D 33/08; B62D 33/02; B62D 33/027; B62D 33/04; B62D 33/06; B62D 65/02;

(Continued)

(56) References Cited

U.S. PATENT DOCUMENTS 1,322,896 A 11/1919 Goennel
1,924,030 A 8/1933 Elser (Continued)

FOREIGN PATENT DOCUMENTS

WO WO 2020/261267 A1 12/2020

OTHER PUBLICATIONS

Drivewise (https://www.drivewise.com/road-safety-tip-remember-to-do-a-circle-check/, Sep. 2017) (Year: 2017).*

(Continued)

*Primary Examiner* — Carly W. Lynch
(74) *Attorney, Agent, or Firm* — Central Texas Patent, P.C.

(57) ABSTRACT

A transformable passenger transport system for a pickup truck includes a removable passenger capsule configured for installation within a truck bed and secured directly to the truck frame via heavy-duty steel brackets. The system includes a specialized walk-through passage assembly installed in the rear wall of the truck cab, comprising door jambs, a threshold, a selectively openable door, and a removable center glass panel. When the capsule is installed with the walk-through passage open, the truck is transformed into an SUV-equivalent passenger vehicle with seamless, weather-sealed passage between the cab and capsule interior. When the capsule is removed and the walk-through passage is closed with the door and center glass panel, the truck reverts to standard pickup configuration. The capsule includes internal roll bars providing occupant protection and passenger seating equipped with seat belts. A loading apparatus facilitates capsule installation and removal by a single operator.

1 Claim, 19 Drawing Sheets

Related U.S. Application Data

(60) Provisional application No. 63/751,007, filed on Jan. 29, 2025, provisional application No. 63/750,980, filed on Jan. 29, 2025.

(58) Field of Classification Search
CPC ....... B62D 65/024; B62D 65/14; B60P 3/423; B60P 3/14; B60P 3/42; B60P 3/32; B60J 7/1607; B60J 5/108; B60J 5/0497; B60J 5/107; B60J 7/1856; B60J 7/194
USPC .................................................... 296/64, 149
See application file for complete search history.

(56) References Cited

U.S. PATENT DOCUMENTS 2,173,076 A 9/1939 Stetson
2,559,029 A 7/1951 Randolph
2,903,042 A 9/1959 Thornburg
2,971,794 A 2/1961 Garcia
3,169,792 A 2/1965 Viquez
3,485,522 A * 12/1969 Reinarts .................. B60P 3/423 296/10
3,496,689 A * 2/1970 Nerem ...................... B60P 3/32 52/204
3,508,786 A * 4/1970 Colville .................... B60P 3/32 296/99.1
3,655,235 A 4/1972 Gray
3,719,244 A 3/1973 Miller et al.
3,840,263 A 10/1974 Bowden
3,881,689 A 5/1975 Bury et al.
3,980,313 A 9/1976 Meinecke, Jr.
4,397,497 A 8/1983 Alonzo, Jr. et al.
4,842,326 A 6/1989 DiVito
4,848,832 A * 7/1989 Starnes ..................... B60P 3/32 296/190.11
4,911,493 A 3/1990 Muirhead
5,029,928 A 7/1991 Huber
5,301,997 A 4/1994 Cudden
5,368,354 A 11/1994 Martin
5,395,202 A 3/1995 Peters
5,398,985 A 3/1995 Bowlby
5,516,179 A 5/1996 Tidwell
5,735,565 A 4/1998 Papai et al.
6,899,378 B2 5/2005 Arias
6,938,949 B1 * 9/2005 Peart ........................ B60J 7/145 296/216.02
7,762,603 B2 7/2010 Hyde
9,027,984 B2 5/2015 Bates
10,086,684 B1 * 10/2018 Stamm, Jr. ............. B60J 7/1621
12,116,045 B1 * 10/2024 Schibler .................. B60R 16/03
2002/0008396 A1 1/2002 De Gaillard
2002/0060477 A1 * 5/2002 Hong ......................... B60J 7/00
2003/0122042 A1 7/2003 Williams, Jr.
2014/0159409 A1 * 6/2014 Razza ..................... B60P 3/423 296/24.33
2016/0243975 A1 * 8/2016 Singer ...................... B60J 7/062
2018/0133074 A1 * 5/2018 Delise .................... B62D 33/02
2021/0245819 A1 * 8/2021 Simonin ................ B62D 33/02
2023/0373570 A1 * 11/2023 Facchinello ............. B60J 7/106
2024/0208308 A1 * 6/2024 Giner ....................... B60J 7/106
2025/0019015 A1 * 1/2025 Hunt .................... B62D 33/046

OTHER PUBLICATIONS

Wagner (https://web.archive.org/web/20220325115949/https:/www.wagnerbrake.com/technical/parts-matter/automotive-repair-and-maintenance/all-about-your-emergency-brake.html, Mar. 2022) (Year: 2022).*
Dillion (https://forum.digikey.com/t/the-importance-of-criss-cross-pattern-of-tightening-bolts/26879, Nov. 2022) (Year: 2022).*

* cited by examiner 2000
2100
2111
2110
1531
1520
1510
1530
1511
2111
2110

TRANSFORMABLE PASSENGER TRANSPORT CAPSULE AND CAB PASS-THROUGH SYSTEM FOR PICKUP TRUCKS

CROSS-REFERENCE TO RELATED APPLICATIONS

This application is a continuation of U.S. patent application Ser. No. 19/463,289 (filed Jan. 29, 2026) for a "TRANSFORMABLE PASSENGER TRANSPORT CAPSULE AND CAB PASS-THROUGH SYSTEM FOR PICKUP TRUCKS." U.S. patent application Ser. No. 19/463,289 claims the benefit of and priority to U.S. Provisional Patent Application No. 63/750,980, filed Jan. 29, 2025, entitled "PICKUP PASS-THROUGH," and U.S. Provisional Patent Application No. 63/751,007, filed Jan. 29, 2025, entitled "TRUCK BED PASSENGER TRANSPORT." The entire contents of U.S. patent application Ser. No. 19/463,289, U.S. patent application Ser. No. 19/463, 289, and U.S. Provisional Patent Application No. 63/751, 007 are specifically incorporated herein by reference.

FIELD OF THE INVENTION

The present disclosure relates generally to automotive accessories and transformable vehicle bodies or reconfigurable body modifications. More particularly, the disclosure relates to a removable passenger seating capsule configured for installation within a pickup truck bed and a weather-sealed pass-through doorway system connecting the pickup truck cab to the capsule. When the capsule is installed, the pickup truck is effectively transformed into a high-capacity passenger vehicle or SUV-equivalent. When the capsule is not installed, the pickup truck is operational as a traditional pickup truck.

BACKGROUND OF THE INVENTION

Current State of Pickup Truck Design

Pickup trucks are traditionally designed with a distinct separation between the passenger cabin (cab) and the cargo bed. While this configuration offers versatility for hauling cargo, it fundamentally limits passenger capacity compared to Sport Utility Vehicles (SUVs) or vans. An extended cab or crew cab truck may offer additional seating, but often at the expense of cargo bed length or with limited legroom and comfort for rear passengers. This architectural constraint has persisted in pickup truck design for decades, creating a persistent gap in the market for consumers who require both substantial passenger capacity and cargo-hauling capability in a single vehicle.

DESCRIPTION OF RELATED ART

Early Attempts at Truck Bed Passenger Utilization

Historically, multiple approaches have been attempted to utilize the cargo bed for passenger accommodation. The simplest approach, basic seats bolted directly to the truck bed, remains widely available in aftermarket markets. However, this solution is regarded as unsafe by automotive safety experts and regulatory bodies due to the complete lack of rollover protection, absence of structural containment, and direct exposure to weather and external elements. These makeshift arrangements provide minimal comfort and no structural integration with the vehicle frame.

Existing Enclosure Solutions

Camper shells and tonneau caps that enclose the bed represent a more sophisticated approach. These aftermarket enclosures can provide weather protection and some structural rigidity. However, they typically isolate rear passengers from the driver and forward cabin environment, creating persistent communication difficulties and climate control challenges. Passengers in an enclosed truck bed lack access to the vehicle's heating and cooling systems, and verbal communication between front and rear occupants is significantly degraded. Furthermore, passengers must exit the vehicle to transfer between the cab and the bed area, creating safety and convenience issues, particularly during inclement weather or in moving vehicles.

Prior Art Patents

Various attempts have been made in the prior art to address the limitations of conventional pickup truck designs, particularly concerning the separation and use of the cabin and the truck bed. These limitations typically revolve around restricted passage, inadequate sealing, cumbersome modification processes, or poor utilization of the combined space for cargo and passengers. The following references illustrate existing approaches and their associated problems, which the present subject matter aims to substantially eliminate or at least partially address.

U.S. Patent Application Publication No. US20140159409A1 describes a "COMPARTMENT INTEGRATING MECHANISM IN DOUBLE CAB PICKUP TRUCKS." This disclosure attempts to integrate the cabin and the truck bed using a multi-purpose "sixth door" located in the rear wall of the cab. The mechanism described is complex, relying on a system of hinges and multiple positions (vertical for separation, horizontal for a roof) that necessitates significant structural modification to the cab's rear wall. This complexity introduces potential issues with durability, long-term weather sealing integrity when the door is closed, and ease of operation. Furthermore, the design is a bespoke, permanent structural element of the vehicle, limiting aftermarket installation or interchangeability.

U.S. Pat. No. 3,655,235 describes a "COACH SECTION FOR PICKUP TRUCK," and U.S. Pat. No. 9,027,984 relates to a "PICKUP BOX ACCESS" system that includes a removable passenger seating space or capsule. Both references focus on converting the truck bed for passenger transport. While these references address the functional goal of carrying passengers in the bed area, they do so by either attaching an external "coach section" (U.S. Pat. No. 3,655, 235) or focusing on non-sealed access to a seating capsule (U.S. Pat. No. 9,027,984). Neither reference adequately addresses the crucial issue of providing a permanent, resealable, and secure passage that integrates the cabin and the bed while maintaining the integrity of the vehicle's interior environment. These solutions lack a seamless, weatherproof, and lockable pass-through that can be quickly opened for a combined space or reliably closed to maintain separate, environmentally controlled compartments.

U.S. Pat. No. 5,301,997 to Cudden describes a modular compartment system intended to convert pickup trucks into passenger vehicles. However, this prior art solution generally requires the removal or replacement of the existing cargo box, representing a permanent, labor-intensive modification that prevents users from easily reverting to a standard truck configuration. The Cudden system does not provide a reversible or user-friendly transformation mechanism and offers limited utility for users who require both configurations.

U.S. Pat. No. 3,485,522 to Reinarts describes an auxiliary cab structure mounted on the truck bed. While conceptually addressing the problem, this solution lacks modern safety integration standards such as rollover protection systems, airbag compatibility, and sophisticated weather-sealing mechanisms that would provide a seamless passenger experience comparable to unibody SUVs. The Reinarts auxiliary cab design predates contemporary automotive safety requirements and does not address the need for integrated structural protection.

Other documented solutions, including boot seals and flexible bellows systems, have been proposed to bridge the cab-to-bed gap. However, these implementations uniformly fail to provide the rigid, structurally secure, and weather-tight connection necessary for safe passenger transit, consistent climate control, and integrated vehicle operation. Flexible sealing systems inevitably degrade due to weather exposure, thermal cycling, and operational stress, resulting in persistent leakage and compromise to passenger comfort and safety.

Identified Deficiencies in Prior Art

The present state of available solutions suffers from critical deficiencies: (1) existing approaches lack convenient, reversible mechanisms to transform the vehicle between dedicated passenger and standard cargo configurations; (2) solutions fail to provide structural safety integration comparable to factory vehicles, particularly regarding rollover protection and frame anchorage; (3) prior art systems do not provide seamless, weather-tight passage between cab and rear compartment comparable to unibody vehicles; and (4) most existing solutions prevent easy reversion to standard truck utility without permanent modification or extensive labor.

Problem Statement and Need for the Invention

There exists a genuine market need for an automotive accessory system that addresses these deficiencies. Specifically, consumers require: (1) a system that provides structural safety equivalent to factory vehicles, including roll bar protection connected directly to the vehicle frame; (2) a seamless, weather-proof passage between the cab and rear compartment that integrates the two spaces into a unified passenger environment; (3) a reversible configuration that allows rapid, tool-free or minimal-tool transformation between passenger and cargo modes; and (4) a system that allows convenient reversion to standard pickup truck utility when the additional passenger capacity is not required, without permanent modification or extensive labor.

SUMMARY OF THE INVENTION

The present invention addresses each identified deficiency by providing a transformable passenger transport system for pickup trucks. The system comprises two primary components: a removable passenger capsule installed within the truck bed, and a specialized pass-through assembly installed in the rear wall of the truck cab.

Capsule System

The passenger capsule includes a structural base, an outer shell, and an internal roll bar system for occupant protection. To ensure safety and structural integrity comparable to factory vehicles, the capsule is not merely attached to the floor of the truck bed but is instead secured directly to the steel truck bed frame via heavy-duty steel brackets and securing bolts. This direct-to-frame connection ensures that crash loads and rollover forces are transmitted directly to the vehicle structure rather than relying on the truck bed floor, which is not designed to carry passenger safety loads.

The capsule is equipped with passenger seating, typically four seats, each equipped with three-point seat belts meeting current federal motor vehicle safety standards. This configuration effectively doubles the passenger capacity of a standard pickup truck cab, while maintaining the vehicle's fundamental truck utility when the capsule is removed.

The capsule roll bars are specifically designed to protect passengers during rollover events and other crash scenarios. The roll bars are not merely decorative structures but are structural members dimensioned and connected to provide occupant protection equivalent to factory-installed systems. The roll bars are connected to the capsule through connecting plates and are ultimately anchored to the truck frame through the securement mechanism, creating a unified protective structure.

Pass-Through Assembly

The system further includes a specialized walk-through door assembly. This assembly replaces the standard rear window and back wall of the truck cab (or a portion thereof). The assembly includes a door jamb frame, a threshold, a weather-sealed door, and structural components that create a rigid, secure interface between the cab and the capsule.

Uniquely, the system is designed to allow complete reversion to factory truck configuration without modification of the vehicle structure. When the capsule is removed, a standard truck bed front wall segment (or back wall cover panel) can be re-installed, and a standard rear window glass or center glass panel can be re-installed, effectively restoring the truck to its original utility configuration. The pass-through assembly is engineered to accommodate this reversibility by utilizing removable components and molded channels that interface with both the cab structure and the optional capsule.

Integrated Operation

When the capsule is installed and the walk-through door assembly is activated (i.e., door removed and opening unobstructed), the walk-through aligns with a corresponding opening in the capsule, creating a continuous, weather-proof passage. This allows passengers to move between the cab and the capsule without exiting the vehicle, integrating the two spaces into a single environment functionally equivalent to an SUV or multifunction vehicle. The weather-sealing is achieved through strategically placed weatherstrip materials at interfaces between the door jambs, the door itself (when closed), and the capsule front face.

The invention thus provides a dual-mode vehicle: (1) "SUV Mode," where the capsule is installed and passengers move seamlessly between cab and rear passenger compartment; and (2) "Truck Mode," where the capsule is removed, the pass-through is sealed with the center glass panel and door, and the vehicle operates as a traditional pickup truck with full cargo bed utility.

BRIEF DESCRIPTION OF THE DRAWINGS

The accompanying drawings, which are incorporated in and constitute a part of this specification, illustrate embodiments of the invention and together with the description serve to explain the principles of the invention.

DETAILED DESCRIPTION OF THE DRAWINGS

Component List and Reference Numerals

| Reference | Component | Description |
|---|---|---|
| 1000 | Capsule | Complete passenger seating structure |
| 1100 | Passenger Seating | Four passenger seats with structural mounting |
| 1110 | Seat Base Bolt | Fastener securing seats to capsule floor |
| 1120 | Seat Belt | Three-point seat belt assembly |
| 1200 | Roll Bars | Protective structural members |
| 1210 | Roll Bar Connecting Plate | Interface between roll bars and capsule floor |
| 1300 | Securing Mechanism | Bolts mating with frame brackets |
| 1400 | Cargo Doors | Rear access doors for capsule |
| 1410 | Back Glass or Window | Rear glazing assembly |
| 1411 | Weather Strip (Back Glass) | Sealing element at window perimeter |
| 1412 | Shock (Back Glass) | Support damper for window |
| 1420 | Back Door of Capsule | Hinged rear door panel |
| 1421 | Door Handle | Passenger grip for door operation |
| 1422 | Hinge for Back Door | Articulation mechanism for door |
| 1500 | Walk-Through Passage | Complete pass-through assembly |
| 1510 | Walk-Through Door | Movable door panel |
| 1511 | Threshold | Floor member at passage opening |

-continued

| Reference | Component | Description |
|---|---|---|
| 1512 | Support Bracket | Structural support for door jambs |
| 1513 | Slide Through Bolt | Fastener for door securement |
| 1520 | Center Removable Cab Glass | Removable central glass panel |
| 1521 | Handle on Glass Panel | Grip for panel extraction |
| 1522 | Molded Channel | Guide for glass panel installation |
| 1523 | Tab | Retention clip for glass panel |
| 1525 | Weather Strip (Glass Panel) | Sealing element at panel perimeter |
| 1530 | Door Jamb | Vertical frame member |
| 1531 | Weather Strip (Door Jamb) | Sealing element at jamb-to-door interface |
| 1600 | Shell | Outer enclosure structure |
| 1610 | Capsule Base | Floor member fitted to truck bed |
| 1611 | Capsule Base Outside Wall | Sidewall of base structure |
| 1612 | Front Opening along Front Surface of Capsule | Interface surface at pass-through |
| 1620 | Capsule Cover | Roof structure |
| 1621 | Capsule Cover Lip | Lip resting on truck bed edges |
| 1622 | Side Windows | Lateral glazing panels |
| 2000 | Pickup Truck | Complete vehicle platform |
| 2100 | Extended Cab | Cab structure with modified rear wall |
| 2110 | Back Wall | Rear panel of cab |
| 2111 | Rear Cab Window | Side glazing (also "side glass of truck cab") |
| 2200 | Truck Bed | Cargo bed platform |
| 2210 | Truck Bed Front Wall Segment | Removable bed front enclosure panel |
| 2220 | Wheel Well | Depression for tire clearance |
| 2300 | Tailgate | Rear gate of truck bed |
| 2800 | Steel Truck Bed Frame | Primary frame structure |
| 2810 | Steel Brackets | Frame-mounted securement points |
| 3000 | Passenger | Occupant utilizing the system |

Detailed Description of Figures

Figure 1:
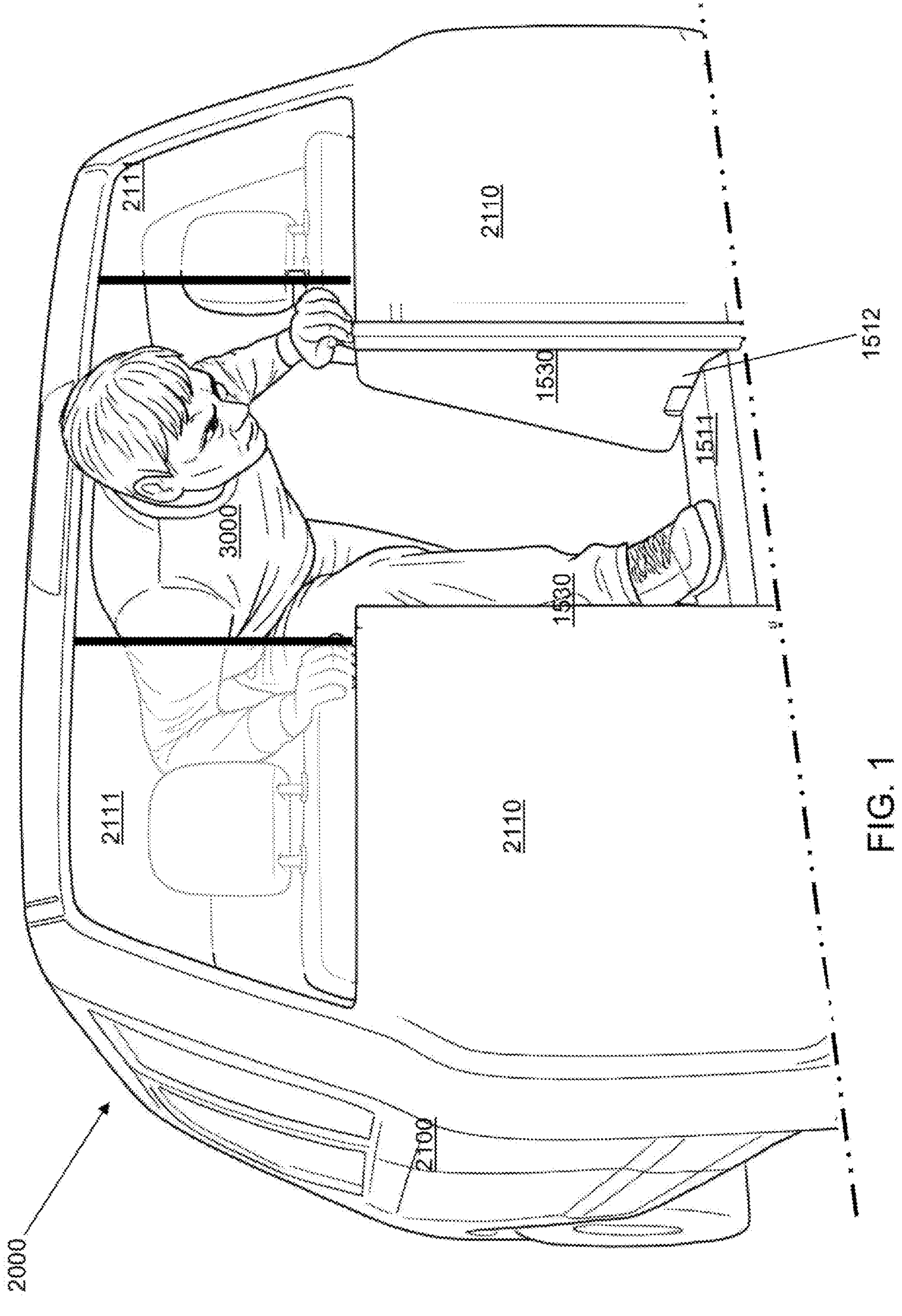
FIG. 1 is an environmental perspective view of a pickup truck cab featuring an open walk-through passage in the rear wall and window, viewed from the truck bed area, with a passenger depicted utilizing the walk-through passage.
Figure 2:
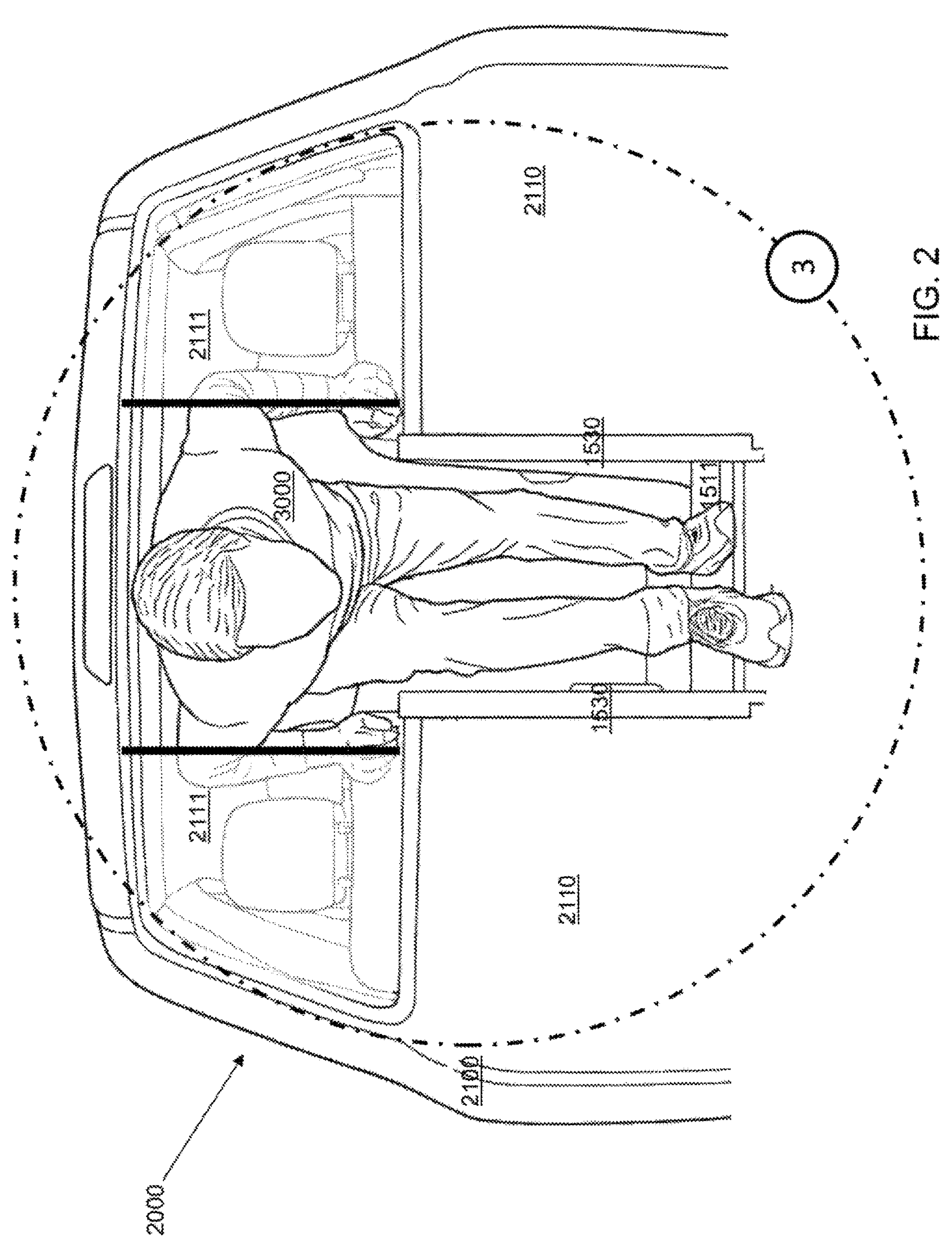
FIG. 2 is a plan view similar to FIG. 1, taken from the perspective of the truck bed looking forward into the cab, showing the passenger stepping from the cab into the bed area with the walk-through passage open and unobstructed.

FIGS. 1-2: Environmental Perspective and Plan Views (Open Configuration)

FIGS. 1 and 2 illustrate the transformable passenger transport system in its open, pass-through configuration, allowing seamless access between the truck cab and the truck bed area.

FIG. 1 presents an environmental perspective view taken from the truck bed area looking toward the cab. The view is directed at the backwall (2110) of the extended cab (2100) of a pickup truck (2000). A passenger (3000) is depicted in the process of passing through an opening defined by the walk-through passage assembly (1500). The assembly includes a walk-through door (1510) that, in the open configuration depicted, is completely removed from the frame, exposing an unobstructed passage. The assembly replaces the standard center portion of the rear cab panel (2110) and rear window (2111).

To the left and right of the walk-through passage (1500), the original or modified rear cab windows (2111), referred to as side glass or side glass of truck cab, remain intact along with the side panels (2110). The windows (2111) are necessarily narrower than the supporting panels (2110) to accommodate the passage width, providing the necessary shoulder room for passenger transit.

The passenger (3000) is depicted stepping over the threshold (1511) that forms the lower boundary of the walk-through frame. The threshold (1511) is dimensioned to provide a step-over height compatible with normal human gait while maintaining structural rigidity and weather-sealing capability. Importantly, the threshold (1511) is positioned at the interface between the cab floor and the truck bed floor, requiring careful integration with existing vehicle geometry.

In operation, a passenger (3000) who is seated within the extended cab (2100) and who wishes to access the rear of the truck (2000)—such as a covered truck bed containing a passenger capsule (1000) or other cargo—may do so by stepping through the walk-through passage (1500) without exiting the vehicle through traditional side-car doors. This capability is particularly valuable during inclement weather or when the vehicle is in motion, as passengers can transfer between front and rear compartments while remaining within the climate-controlled environment and while maintaining contact with the vehicle.

The passage (1500) architecture demonstrates that the system does not simply add a hole to the cab; rather, it creates a fully articulated architectural interface with defined boundaries, structural support, and weather-sealing capability.

Use During SUV Mode Operation:

During SUV Mode operation, when a passenger capsule (1000) is installed within the truck bed (2200), the walk-through passage (1500) in its open configuration creates a continuous interior space from the front cab seats through to the rear passenger seating (1100) within the capsule (1000). Passengers can move between front and rear seating positions without opening external doors, just as they would in a factory SUV or minivan. The threshold (1511) remains in place but becomes an architectural element of the unified interior rather than a barrier.

FIG. 2 illustrates a plan view similar to FIG. 1 but taken from the perspective of the truck bed looking straight forward into the cab. As in FIG. 1, the passenger (3000) is depicted stepping from the cab area into the bed area, with the truck bed walls not shown for visual clarity. The walk-through passage (1500), as depicted from this perspective, clearly shows the vertical door jambs (1530) that define the left and right boundaries of the passage.

The space between the two rear cab windows (2111) and the jambs (1530) provides shoulder room for safe passenger passage. The threshold (1511) remains visible at the bottom of the frame. The dimensions of the passage (1500) are specifically engineered to accommodate the 5th and 95th percentile anthropometric range for passenger transit, ensuring accessibility for the vast majority of the population.

This figure illustrates the ease of access provided by the system and demonstrates that the passage width, height, and threshold step-over clearance are compatible with safe, unrestricted human passage during normal vehicle operation.

Figure 3:
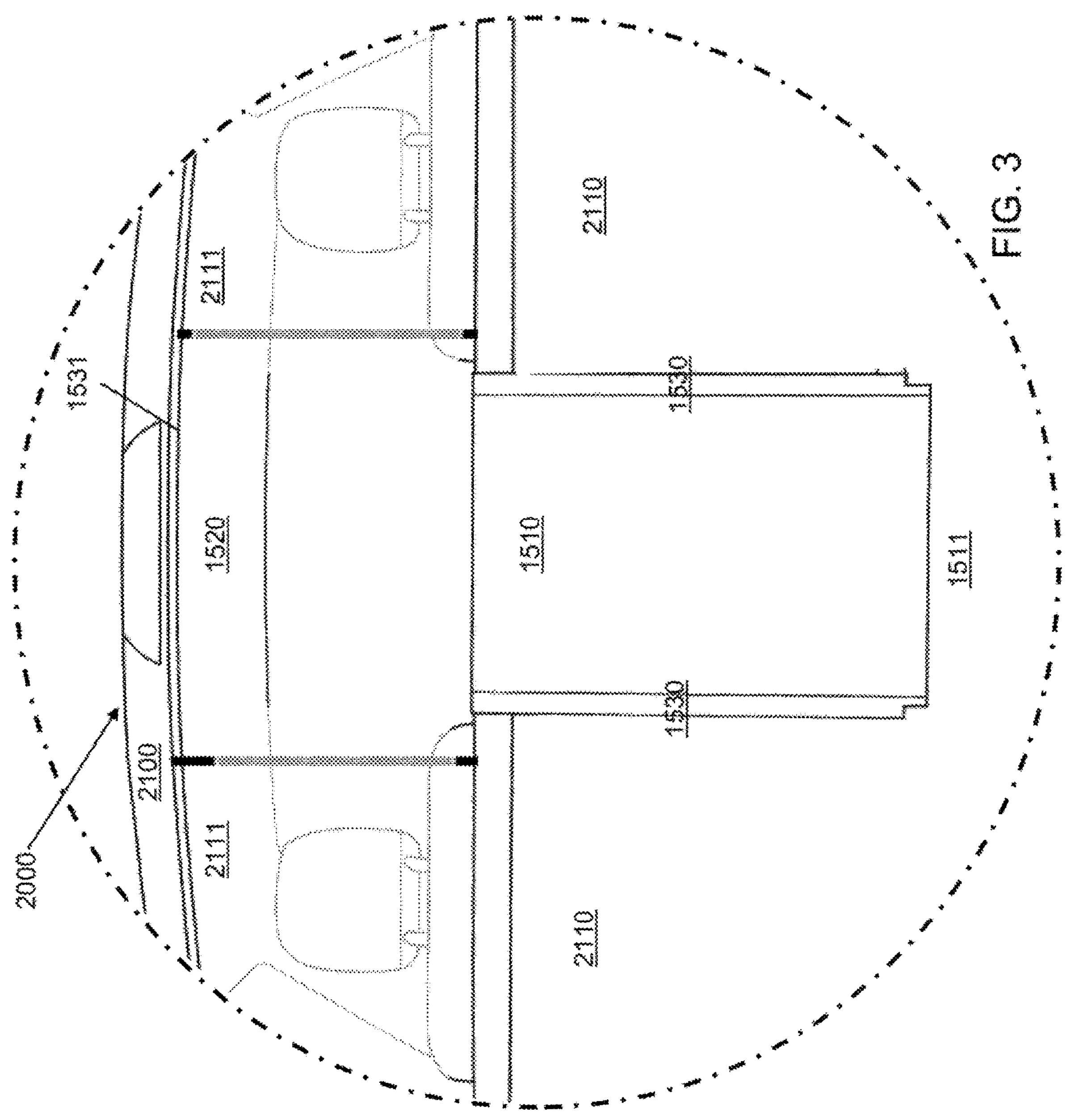
FIG. 3 is an environmental comparison view to FIG. 2, illustrating the closed-door configuration of the walk-through passage from the truck bed perspective, with door jambs and weather-sealing elements visible.
Figure 4:
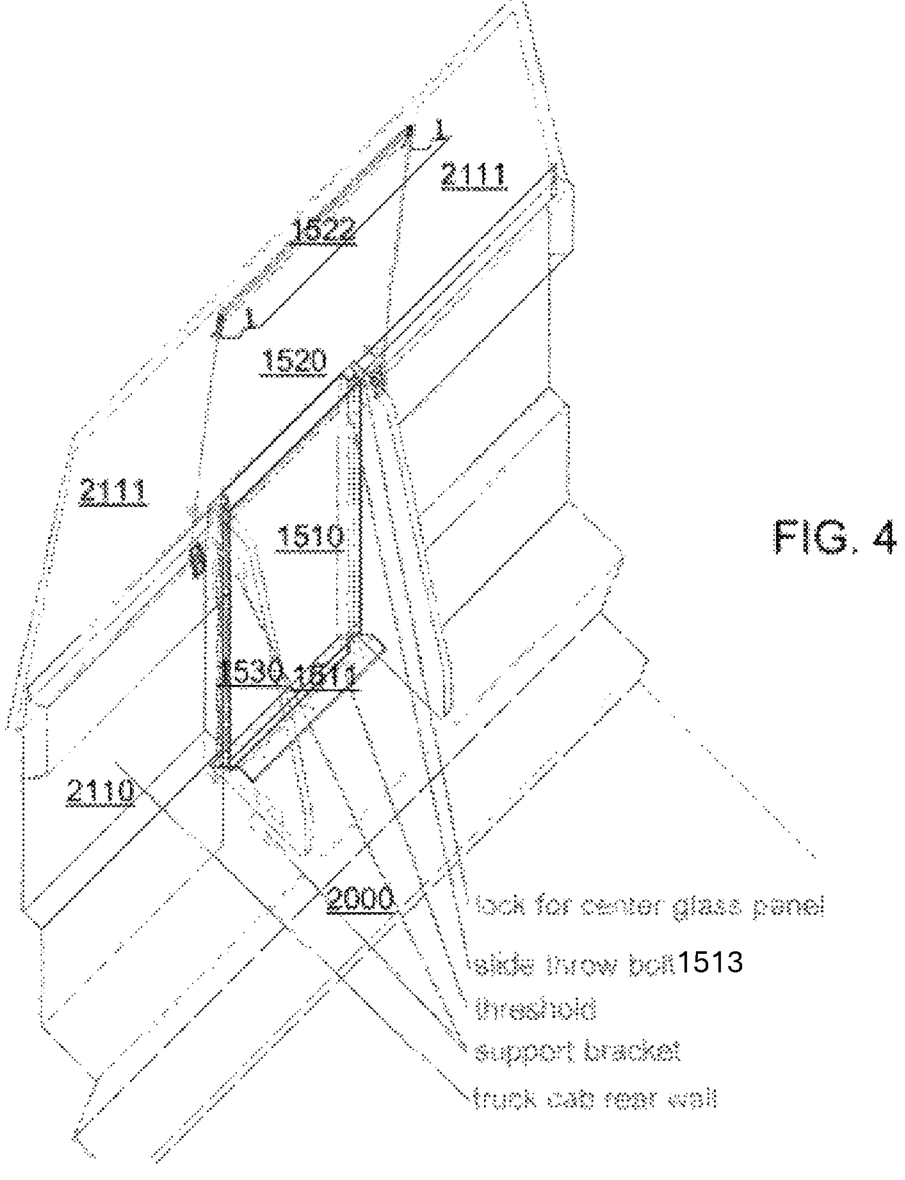
FIG. 4 is a perspective view of the assembled walk-through passage in closed configuration, viewed from the cab interior perspective, showing door jambs, threshold, and center glass panel in installed positions.
Figure 5:
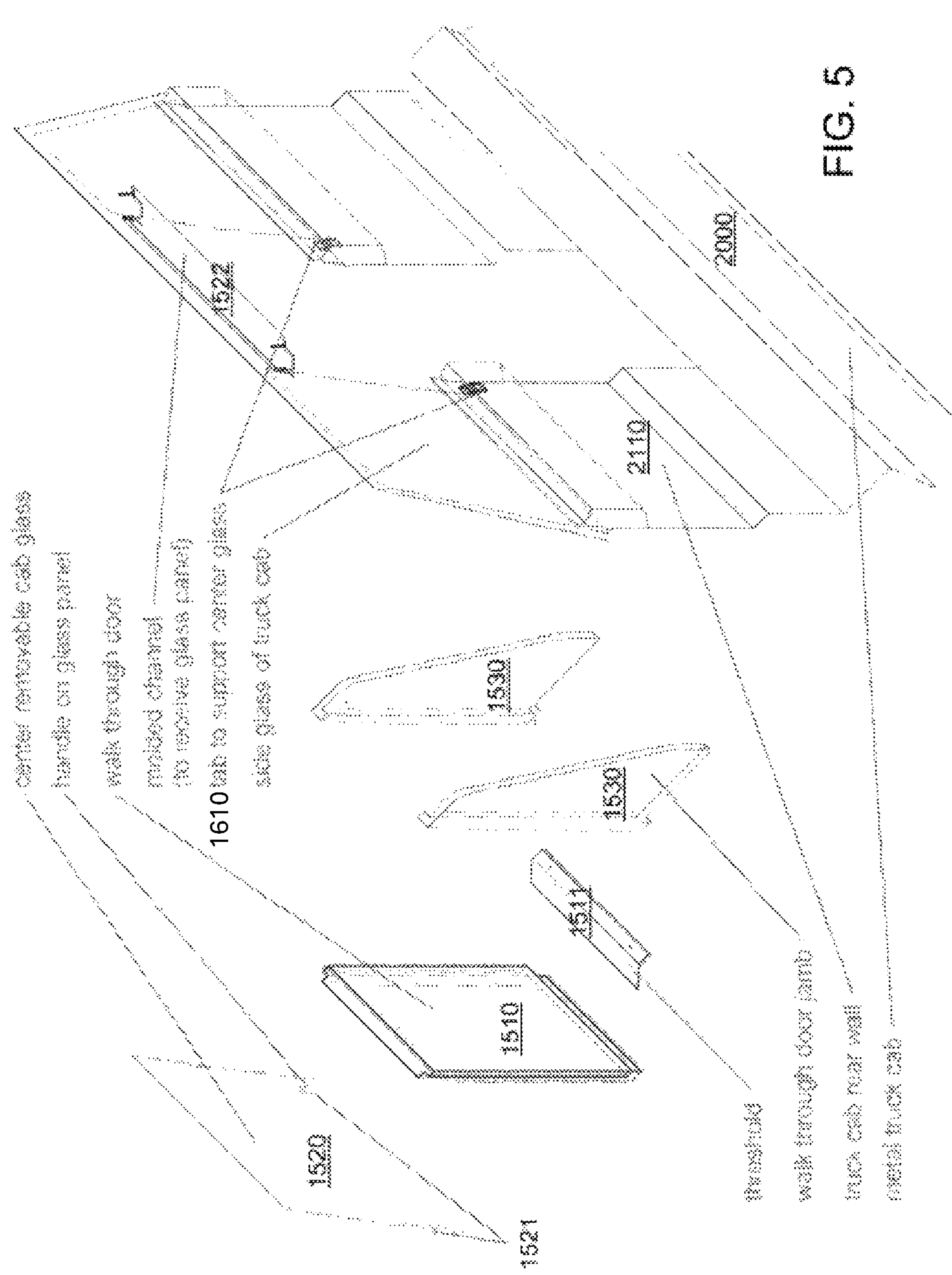
FIG. 5 is an exploded perspective view of the walk-through assembly in the rear wall of the truck cab, showing the walk-through door, threshold, removable center glass panel with handle, door jambs, and molded channel in separated positions to illustrate component relationships.

FIGS. 3-5: Closed Configuration and Component Assembly

FIG. 3 provides a comparison view to FIG. 2, illustrating the closed-door configuration of the walk-through passage (1500) from the truck bed perspective. This closed configuration is utilized when operating the vehicle in standard "Truck Mode" with the passenger capsule (1000) not installed.

In the closed configuration, the door jambs (1530) are clearly visible projecting from the cab back wall (2110), providing engagement points and a rigid frame structure. A weather strip (1531) is provided at the top and sides of the walk-through passage (1500) to ensure a weather-proof interface. The passage (1500) is sealed by insertion of a center glass panel (1520) into a molded channel (1522) and by installation of a walk-through door (1510) between the jambs (1530).

The door jambs (1530) are engineered to provide a rigid frame sufficient to support the door (1510) and prevent deflection during vehicle operation, even under rough road conditions or during cornering maneuvers. The jambs (1530) are typically fabricated from steel tubing or rolled steel channel section and are welded directly to the cab back wall (2110) structure or attached through robust mechanical fasteners.

Use During Truck Mode Operation:

During standard Truck Mode operation, when the passenger capsule (1000) is not installed, the walk-through passage (1500) is closed via installation of the door (1510) and center glass panel (1520). The truck reverts to a standard pickup truck configuration, with the closed passage appearing as a conventional rear window arrangement from external view. The weatherstrip (1531) seals the interface between the door jambs (1530) and the door (1510), preventing water infiltration and wind noise. The center glass panel (1520), once installed, allows rear-facing visibility while maintaining the thermal enclosure of the cab.

Additionally, during Truck Mode, a removable truck bed front wall segment (2210), also called a back wall cover panel, is installed at the front of the truck bed (2200). This panel (2210) covers the external face of the closed pass-through assembly (1500) from the truck bed perspective, creating an appearance identical to a factory truck with a rear window.

FIG. 4 illustrates the assembled walk-through passage (1500) in its closed configuration, as viewed from the cab interior perspective. The door jambs (1530) are installed adjacent to the rear cab windows (2111), with the windows (2111) remaining in their original positions. The threshold (1511) connects the jambs (1530) at the bottom, forming a rigid, closed structural loop.

The walk-through door (1510) is positioned between the door jambs (1530) either directly from the top or pushed in normal relative to the opening and then lowered in a guillotine-like orientation. 20 The door (1510) may then be held in place via a throw bolt or slide-throw mechanism (1513). When the door (1510) is removed by releasing the throw bolt (1513), it lifts out vertically from its mounting position, allowing full access through the passage (1500).

The center glass panel (1520) is inserted into a funnel-like molded channel (1522) that receives the panel (1520) and guides its installation. Once inserted, the panel (1520) is secured inside with locks or spring-clip retention elements positioned adjacent to the door jambs (1530). The handle (1521) on the panel (1520) permits easy extraction of the panel when transformation from Truck Mode to SUV Mode is desired.

The weather strip (1531) seals the interface between the door jambs (1530) and the door (1510). This weather strip (1531) is typically a high-durometer rubber or silicone material with a shape optimized to compress slightly during door installation, creating a positive pressure seal that prevents water and air infiltration.

FIG. 5 is an exploded perspective view of the walk-through assembly (1500) in the rear wall (2110) of the truck cab (2100) of a pickup truck (2000). The components are depicted in a spatially separated arrangement to illustrate the relationships and assembly sequence.

The walk-through door (1510) is shown as a flat panel, typically fabricated from steel, wood frame or composite material with a finished face. The door (1510) must be sufficiently rigid to prevent deflection and rattle during vehicle operation while remaining light enough to be manually removed and installed by a single operator.

The threshold (1511) is depicted as a structural member spanning between the two door jambs (1530), providing a step-over surface and contributing to the overall rigidity of the assembly. The threshold (1511) is sealed with a weather strip to prevent water infiltration at ground level.

The removable center glass panel (1520) is shown with its handle (1521). The glass panel (1520) is fabricated from laminated safety glass or high-impact polycarbonate, providing transparency, impact resistance, and acoustic insulation. The handle (1521) is ergonomically positioned to permit extraction with normal grip strength.

The molded channel (1522) is depicted as a receptacle that guides the edges of the glass panel (1520) during installation. The channel (1522) is shaped to prevent vertical shifting of the panel (1520) while allowing sliding insertion from below.

The door jambs (1530) are shown as vertical structural members forming the left and right boundaries of the passage. Each jamb (1530) is integrated with the cab back wall (2110) through welding or mechanical fastening.

Support brackets (1512) are depicted as additional structural elements that may be employed to brace the jambs (1530) and resist lateral loads during vehicle operation.

Use During Transformation and Operation:

The assembly shown in FIG. 5 demonstrates the complete transformation sequence. To convert from Truck Mode to SUV Mode: (1) the center glass panel (1520) is grasped by handle (1521) and extracted vertically from the molded channel (1522); (2) the throw bolt (1513) is released, allowing the walk-through door (1510) to be lifted vertically out of the jamb frame; and (3) the passage (1500) is now open and ready to interface with the installed passenger capsule (1000).

To revert from SUV Mode to Truck Mode, the process is reversed: (1) the walk-through door (1510) is positioned between the jambs (1530) and secured via the throw bolt (1513); (2) the center glass panel (1520) is installed by first sliding it upward into the molded channel (1522) and then sliding it down into the tabs before then securing the class inside on top of the jambs (1530); (3) the weather strip (1531) is verified to be in proper compression; and (4) the truck bed front wall segment (2210) is installed, completing the closure.

Figure 6:
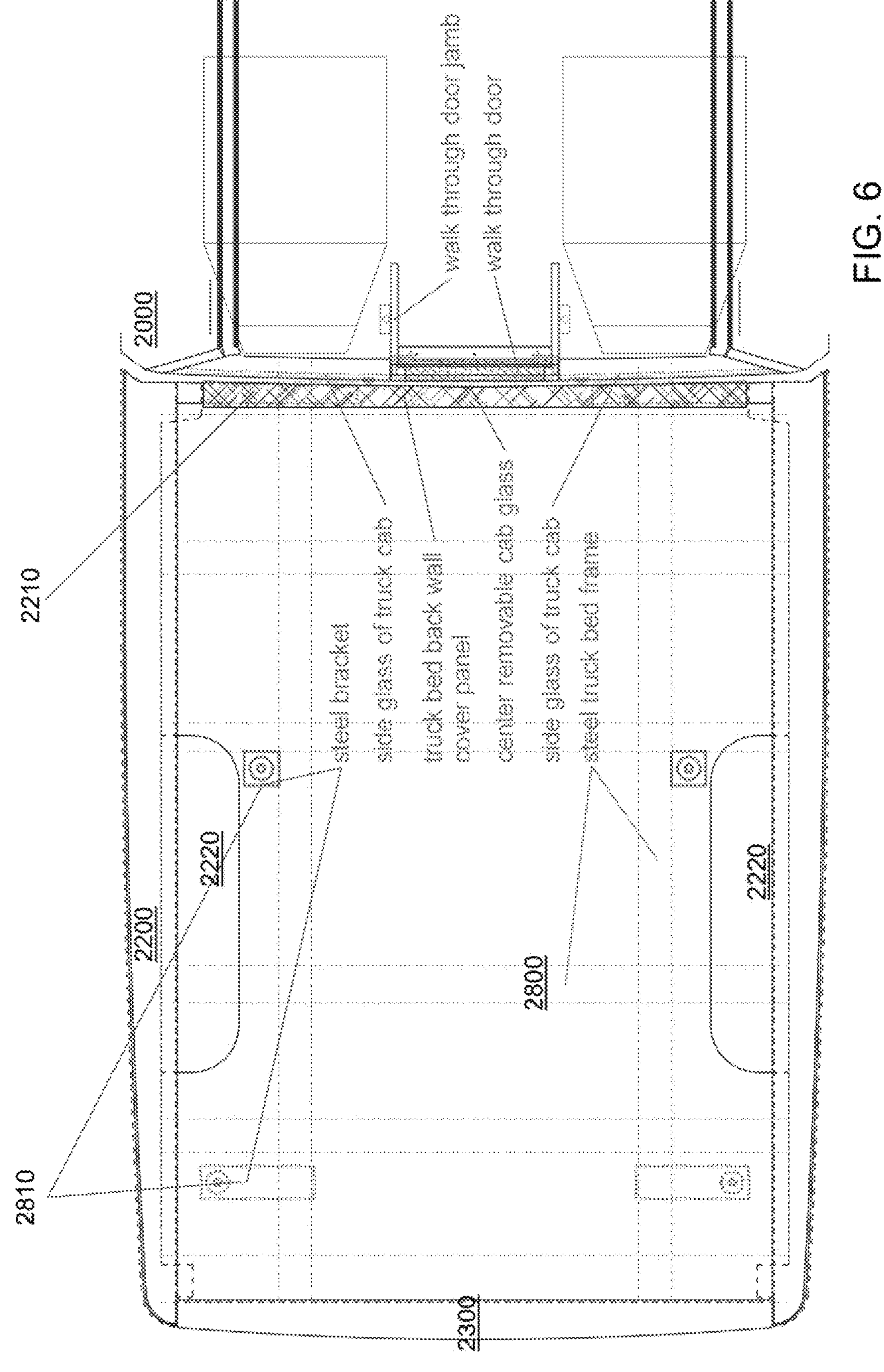
FIG. 6 is a top plan view of the truck bed in standard closed-door pass-through configuration, showing the location of frame-mounted steel brackets accessible through the bed floor and depicting the vehicle in standard operating configuration with truck bed front wall segment installed.
Figure 7:
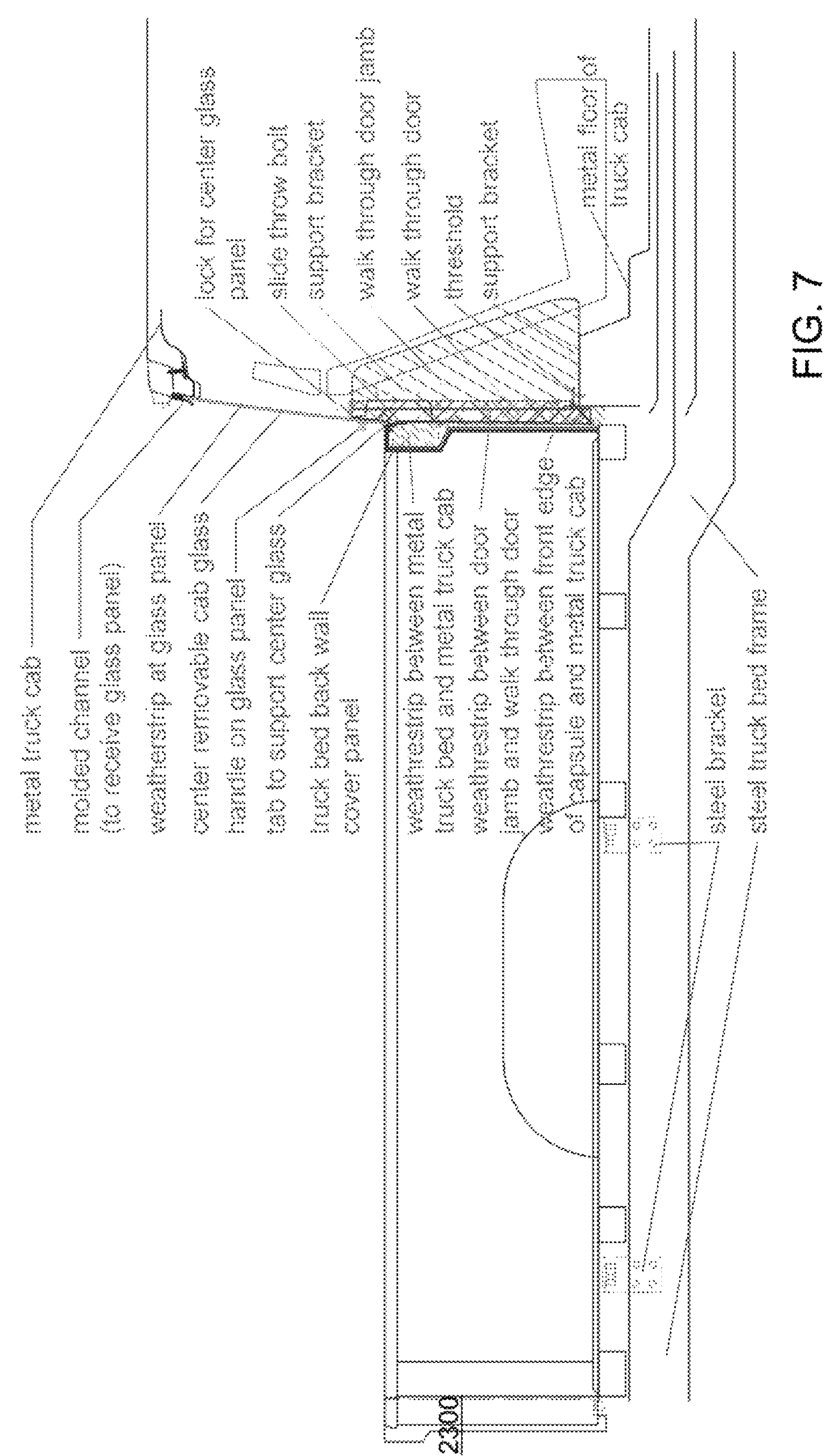
FIG. 7 is a side elevation view of the truck bed corresponding to FIG. 6, illustrating frame-mounted brackets and confirming that the modification does not impair standard truck utility when the capsule is removed.

FIGS. 6-7: Truck Mode Configuration with Frame Brackets

FIG. 6 is a top plan view of the truck bed (2200) when configured in standard Truck Mode, with the walk-through passage (1500) in closed configuration. The view reveals the steel truck bed frame (2800) shown in phantom or cutaway for visibility.

Critically, steel brackets (2810) are shown attached to the frame (2800) and protruding through or remaining accessible from the bed floor (2200). These brackets (2810) represent a central innovation of the present system: they are installed permanently during the initial modification and remain in place regardless of whether the passenger capsule (1000) is installed. When the capsule (1000) is not installed, the brackets (2810) remain accessible through the truck bed floor, available for conventional cargo securing purposes such as anchoring tie-downs or cargo nets.

A truck bed front wall segment (2210), also referred to as a back wall cover panel, is installed at the front of the bed (2200) in Truck Mode. This segment (2210) functions to completely cover and protect the walk-through passage assembly (1500) from the truck bed perspective and to restore the truck to a standard appearance. The front wall segment (2210) is a removable component that can be lifted out and set aside when preparing to install the passenger capsule (1000).

The figure demonstrates that the vehicle in Truck Mode appears and functions identically to a standard pickup truck with a rear window. The presence of the brackets (2810) does not interfere with standard cargo loading, as the brackets (2810) are positioned to avoid obstruction of common cargo configurations.

Use During Truck Mode Operation:

During standard Truck Mode operation, the frame brackets (2810) provide secure points for anchoring cargo directly to the truck frame, bypassing the truck bed floor, and eliminating the need for separate cargo tie-down systems. This provides a practical utility enhancement even when the system is operating in Truck Mode.

FIG. 7 is a side elevation view of the truck bed (2200) configuration depicted in FIG. 6. The view clearly shows the truck (2000) from a profile perspective with the bed (2200) empty, demonstrating that the presence of the frame-mounted brackets (2810) and pass-through passage assembly (1500) does not visually or functionally impair the truck's standard utility.

The figure confirms that when viewed from the side, the modification appears minimal and does not create unusual or unfamiliar silhouette. The profile height and overall dimensions remain compatible with standard garage structures and vehicle transportation limitations.

FIGS. 8-11: Capsule Structure and Dimensions

Figures 8, 9, 10, 11:
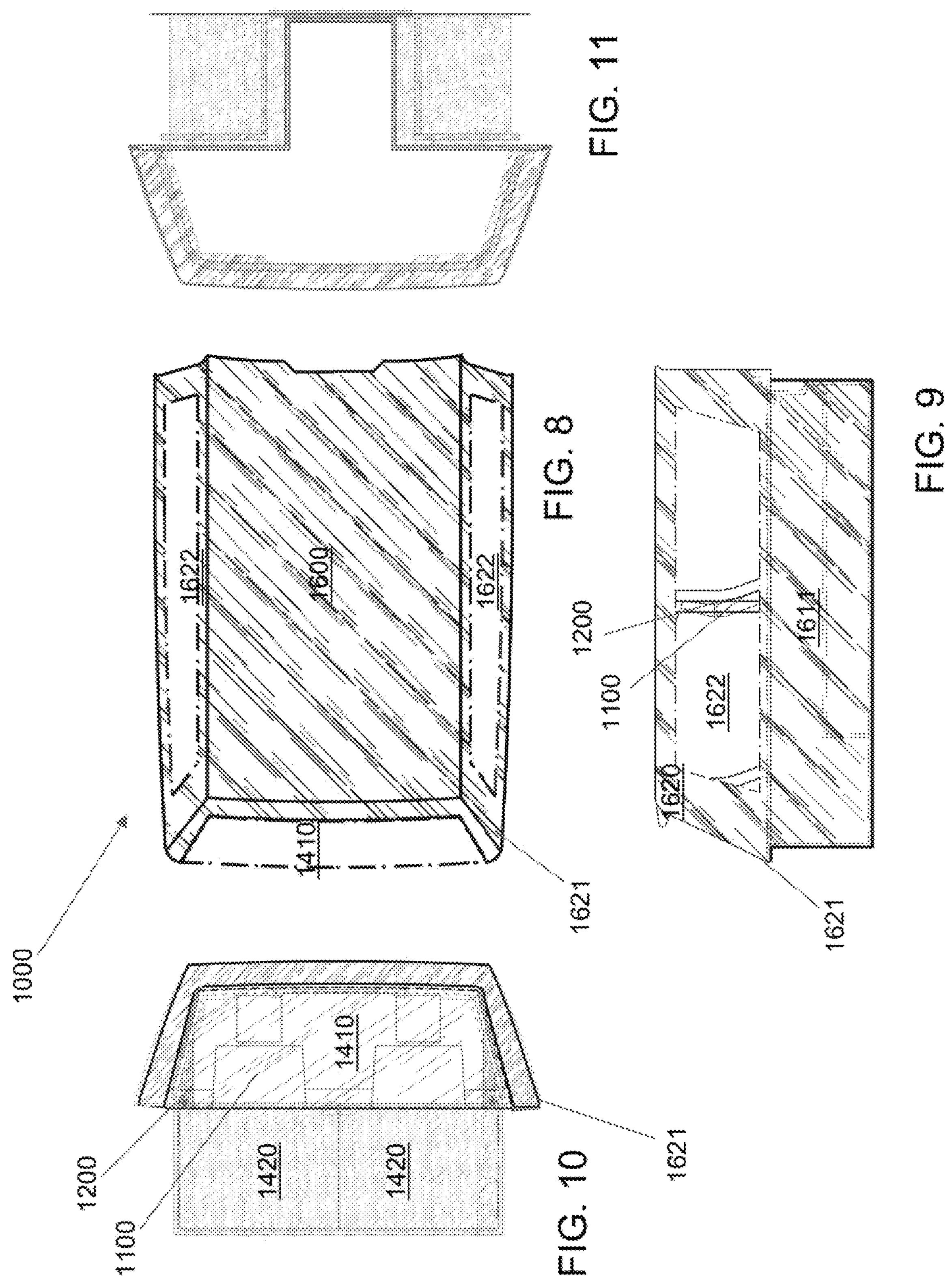
FIG. 8 is a top plan view of a passenger capsule configured for installation within the pickup truck bed, showing overall dimensions and passenger seating layout.
FIG. 9 is a right side plan view of the capsule, showing depth, height, and the relationship of the capsule to the truck bed dimensions (the left side view is a mirror image of the right side).
FIG. 10 is a rear plan view of the capsule, showing cargo doors and rear window configuration.
FIG. 11 is a front plan view of the capsule, illustrating weather-proofing features at the interconnection with the walk-through passage of the truck cab.

FIG. 8 is a top plan view of a passenger capsule (1000) configured for installation within the pickup truck bed. The figure presents overall dimensions and reveals the capsule's footprint relationship to standard pickup truck beds. The capsule (1000) is sized to fit within the bed (2200) of a full-size pickup truck, typically accommodating a 5.5-foot, 6.5-foot, or 8-foot bed depending on the specific truck model.

The capsule base (1610) is dimensioned to fit within the lateral constraints of the truck bed sidewalls (2200), with minimal clearance to prevent shifting during vehicle operation. The capsule base (1610) includes an outside wall (1611) that interfaces with the truck bed sidewalls (2200).

Passenger seating (1100) is arranged within the capsule (1000) in a two-plus-two configuration, with two seats positioned forward (closest to the cab interface) and two seats positioned aft. This arrangement provides a seating geometry compatible with typical four-door SUV configurations and facilitates ease of ingress and egress to rear seats from the forward cab area via the walk-through passage (1500).

FIG. 9 is a right side plan view of the capsule (1000), showing depth, height, and the relationship of the capsule (1000) to the truck bed dimensions. The left side plan view (not shown) would be a mirror image of the right side view depicted. This view reveals the capsule height (1000) and its relationship to the truck bed sidewalls. The capsule (1000) extends vertically from the truck bed floor to a height approaching the top edge of the truck bed sidewalls, maximizing interior volume while maintaining capsule lip (1621) engagement on the top edges of the bed sidewalls and tailgate.

The capsule (1000) accommodates roll bars (1200) that traverse the interior volume at strategic locations to provide occupant protection. The roll bars (1200) are positioned at heights that allow passenger ingress and egress while providing overhead protection.

FIG. 10 is a rear plan view of the capsule (1000), illustrating the cargo doors (1400) and rear window (1410) configuration. The cargo doors (1400) are positioned symmetrically at the rear of the capsule (1000), allowing access to storage space within the capsule for luggage, sporting equipment, or other cargo.

The rear window (1410) provides rearward visibility and allows natural light to illuminate the rear seating area. The rear window (1410) is sealed with a weather strip (1411) to prevent water infiltration. A shock element (1412) or damper may be employed to support the window (1410) in the open position and to control window closing velocity.

The cargo doors (1400) are accessed from outside the capsule, typically by opening the truck tailgate (2300), which sits below and behind the capsule (1000) during installation. This configuration maintains the capsule (1000) within the truck bed boundaries and allows utilization of the existing truck tailgate (2300) as part of the overall secure enclosure system.

FIG. 11 is a front plan view of the capsule (1000), illustrating the weather-proofing features at the interconnection with the walk-through passage (1500) of the truck cab (2100). This view reveals the critical interface between the capsule (1000) and the cab (2100).

The front opening (1612) along the front surface of the capsule presents an interface face toward the cab (2100). This interface face includes features such as the door opening (1500 interface) that aligns with the walk-through passage (1500) opening when the capsule (1000) is installed. The front opening (1612) includes integrated weather stripping and sealing surfaces that create a weather-proof joint when mated with the door jambs (1530) and associated sealing elements.

The capsule front structure is engineered to withstand the loads transferred through the walk-through passage interface, including inertial loads during vehicle acceleration, braking, and cornering. The interface is sufficiently rigid to prevent relative motion between the cab (2100) and the capsule (1000) during dynamic vehicle operation.

Use During SUV Mode Assembly:

During installation of the capsule (1000) into SUV Mode, the front opening (1612) aligns precisely with the door jambs (1530) and threshold (1511) of the walk-through passage (1500). Once aligned and secured, the capsule (1000) and cab (2100) function as an integrated structure. Weather seals at this interface prevent wind and water infiltration, maintaining the thermal comfort and dryness of the integrated interior space.

Figures 12A, 12B:
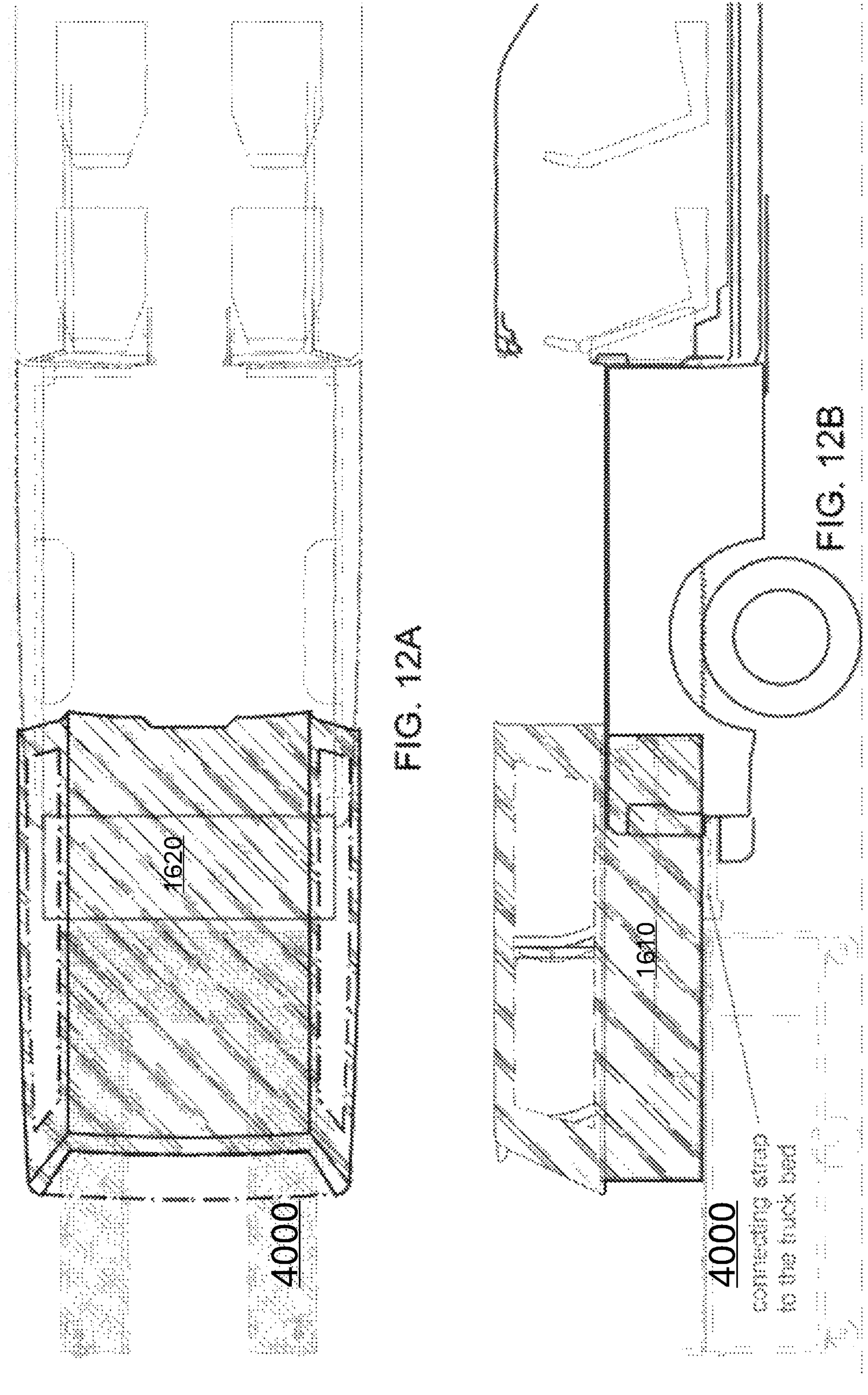
FIG. 12A is a top view of a loading apparatus for assisting with loading and unloading the passenger capsule into and from the truck bed.
FIG. 12B is a side view of the loading apparatus, showing the wheeled platform, alignment features, and connecting strap for capsule securment during transfer.

FIGS. 12A-12B: Loading Apparatus

FIGS. 12A and 12B illustrate a loading apparatus (4000) configured to assist a user in loading and unloading the passenger capsule (1000) into and from the truck bed (2200).

FIG. 12A is a top view of the apparatus (4000), showing the overall footprint and component arrangement. The apparatus (4000) comprises a wheeled platform or cart with a horizontal top surface dimensioned to support the capsule (1000) and guide its sliding motion into the truck bed (2200). The apparatus (4000) is equipped with wheels or casters to provide mobility and ease of positioning.

A connecting strap or alignment guide is provided to maintain the apparatus (4000) in axial alignment with the truck bed (2200) and to prevent lateral shifting of the capsule (1000) during the insertion process. The strap is secured to the truck bed frame or bed structure to establish a reference geometry.

A central alleyway or gap is provided in the apparatus (4000) top surface to permit a user or operator to push the capsule (1000) as they walk down the passage almost to where the table top and tailgate meet, facilitating manual pushing or powered assist during the capsule insertion process.

FIG. 12B is a side view of the apparatus (4000), depicting the wheeled base, the platform height (which aligns approximately with the open truck bed top edge), and the functional relationship between the apparatus (4000) and the truck bed (2200). The cart is constructed with an adjustable height mechanism. See U.S. Provisional Patent Application No. 63/750,980, filed Jan. 29, 2025, entitled "PICKUP PASS-THROUGH," and U.S. Provisional Patent Application No. 63/751,007, filed Jan. 29, 2025, entitled "TRUCK BED PASSENGER TRANSPORT." The figure illustrates how the apparatus (4000) can be rolled into position adjacent the truck tailgate (2300), with the platform height matching the truck bed edge, allowing the capsule (1000) to slide from the apparatus (4000) directly onto the truck bed floor (2200) with minimal height differential.

Use During Capsule Installation:

The apparatus (4000) is utilized as follows: (1) the apparatus (4000) is positioned at the rear of the truck (2000) with the truck tailgate (2300) lowered; (2) the passenger capsule (1000) is positioned on the apparatus (4000) top surface; (3) the connecting strap is secured to the truck frame to prevent apparatus (4000) drift; (4) a user or users manually push the capsule (1000) from the apparatus (4000) onto the truck bed floor (2200); (5) once the capsule (1000) is fully inserted into the bed (2200), the apparatus (4000) is withdrawn and stored. This process allows a single user to safely manipulate the capsule (1000) without risk of dropping or misalignment.

Figure 12C:
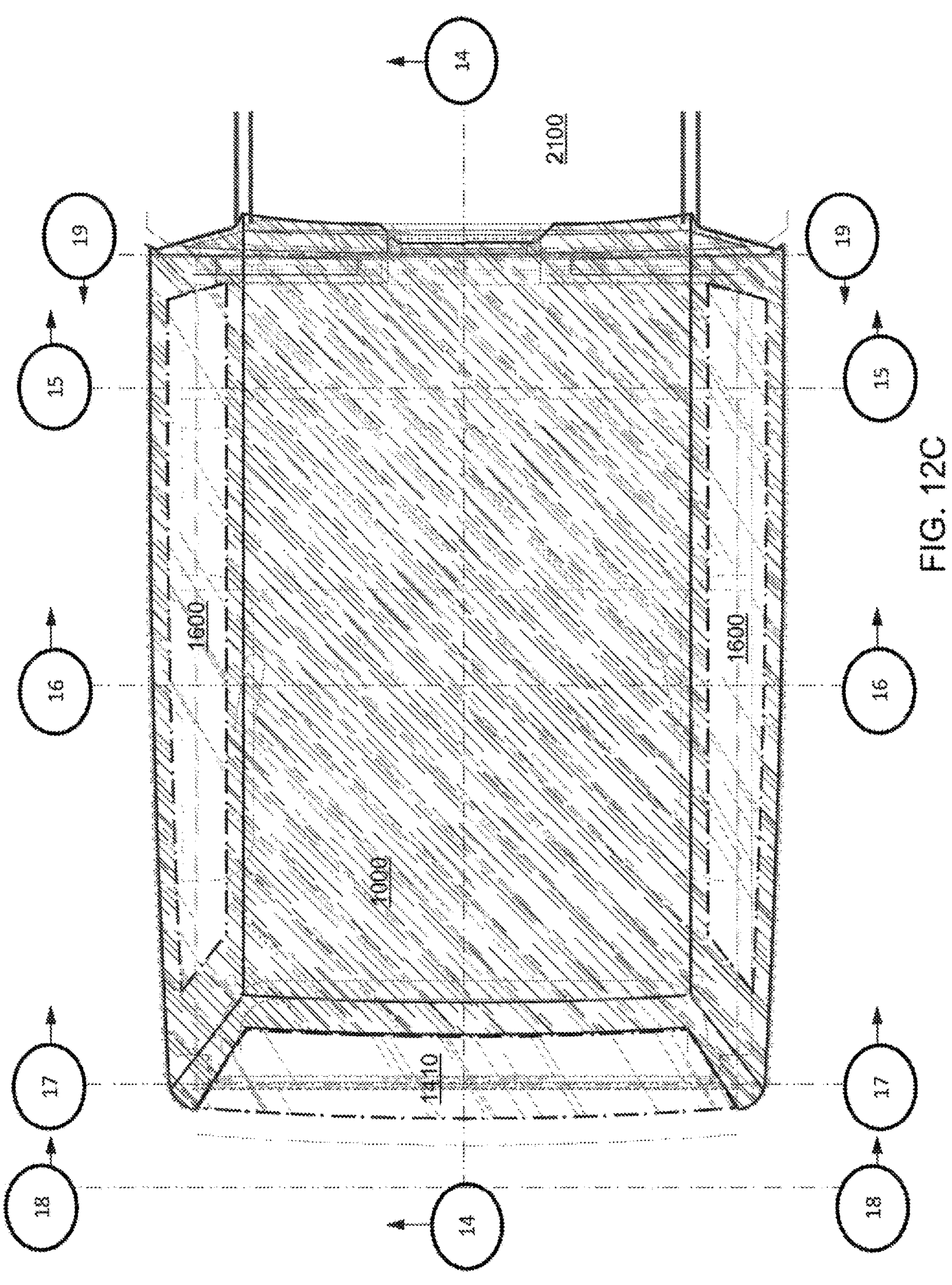
FIG. 12C is a top plan view of the passenger capsule installed within the pickup truck bed, showing the complete system in SUV Mode with walk-through passage connecting cab to capsule.

FIG. 12C: Complete System Installation Plan View

FIG. 12C illustrates a top plan view of the complete transformable passenger transport system with the passenger capsule (1000) installed within the truck bed (2200) of the pickup truck (2000). This view represents the vehicle in SUV Mode.

As shown, the capsule (1000) is fully installed within the truck bed (2200). Although not visible in this plan view, the capsule (1000) is secured to the frame (2800) (shown in phantom or not shown) rather than merely resting on the bed floor (2200). The capsule (1000) is positioned with its front opening (1612) aligned with the walk-through passage (1500) opening in the rear wall (2110) of the extended cab (2100).

The capsule (1000) is aligned with the extended cab (2100) such that when installed, the complete truck (2000) system resembles a traditional, heavy-duty SUV with a unified interior cabin spanning from the front driver and passenger positions through to the rear passenger positions. The walk-through passage (1500) creates a continuous, unobstructed passage between the cab (2100) and the interior of the capsule (1000).

At the rear, the system utilizes the truck's existing tailgate (2300) in conjunction with capsule cargo doors (1400) to form a secure and weather-proof rear closure. The tailgate (2300), when viewed in this plan, appears to pass under or behind the capsule (1000), creating a unified rear structure.

This view demonstrates the "SUV Mode" configuration wherein the capsule (1000) and truck (2000) have been transformed into a high-capacity passenger vehicle. The capsule (1000) occupies substantially the entire truck bed (2200) area, indicating complete utilization of the available space for passenger comfort and protection.

Use During SUV Mode Operation:

In this configuration, the truck (2000) functions as a passenger vehicle with six total seating positions: two in the front cab (standard truck configuration) and four in the rear capsule (1000). Passengers can move between front and rear positions via the walk-through passage (1500) while the vehicle is in motion, accessing climate control, audio, and navigation systems throughout the unified cabin environment.

Figure 13:
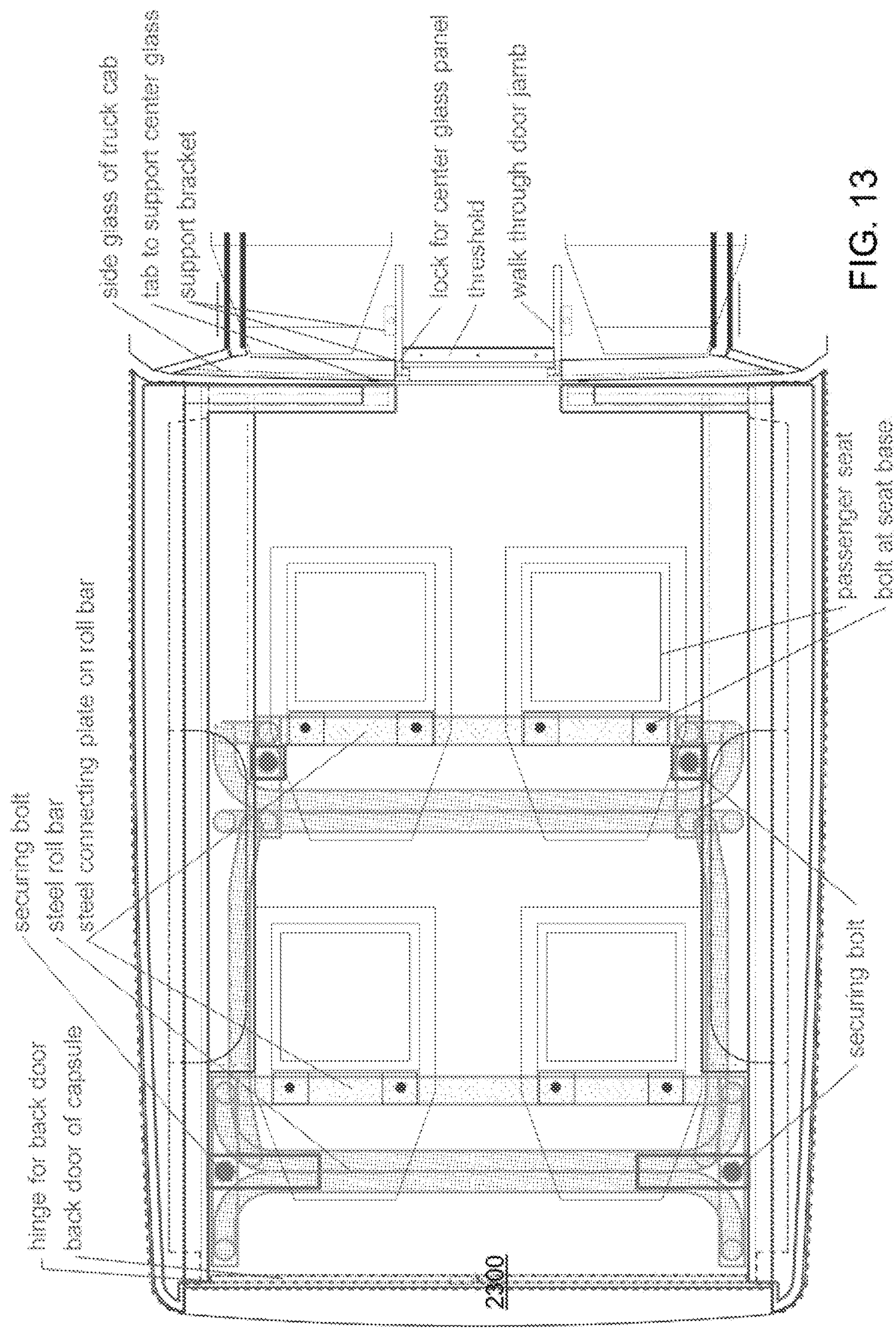
FIG. 13 is a top "X-ray" view of the installed capsule within the truck bed, detailing the internal layout including walk-through passage, seating arrangement, roll bar structure, and cargo doors.

FIG. 13: Interior Layout and X-Ray View

FIG. 13 is a top "X-ray" view of the fully installed capsule (1000) within the truck bed (2200). The X-ray perspective allows visualization of interior components despite the opaque shell structure. This view provides crucial detail regarding the internal arrangement of seats, roll bars, and other safety-critical components.

The walk-through passage (1500) connects the cab (2100) to the capsule (1000) interior. The passage opening is clearly visible as a rectangular opening in the front wall of the capsule (1000), aligned with the corresponding opening in the cab back wall (2110).

Four passenger seats (1100) are visible in the X-ray view, arranged in a two-plus-two configuration. The forward pair of seats (1100) is positioned closer to the walk-through opening (1500), facilitating easy ingress and egress. The aft pair of seats (1100) is positioned toward the rear of the capsule (1000).

Roll bars (1200) are depicted spanning the interior of the capsule (1000) at strategic locations. The roll bars (1200) are positioned to provide overhead protection to occupants seated beneath them while not creating visual or physical obstructions to ingress or normal passenger movement. The roll bars (1200) are engineered to resist bending or collapse under the loads that would be experienced during a vehicle rollover event.

Cargo doors (1400) are located at the rear of the capsule (1000), behind the closed tailgate (2300). This placement allows cargo access without disrupting the passenger seating area and without requiring removal of passengers to access storage.

The X-ray view reveals the securing mechanisms (1300) that connect the capsule (1000) to the frame (2800). These securing mechanisms (1300) are positioned at strategic locations—typically forward, aft, and laterally—to create a rigid, multi-point attachment that resists shifting and maintains capsule stability during dynamic vehicle operation.

Use During SUV Mode Operation:

The interior layout shown in FIG. 13 demonstrates the spatial efficiency and passenger accommodation of the system. Passengers can move forward and aft through the walk-through passage (1500), accessing different seating positions and cargo areas while the vehicle is operated. The roll bar structure (1200) remains transparent (visually unobtrusive) to passengers during normal operation while providing critical safety protection in crash or rollover scenarios.

Figure 14:
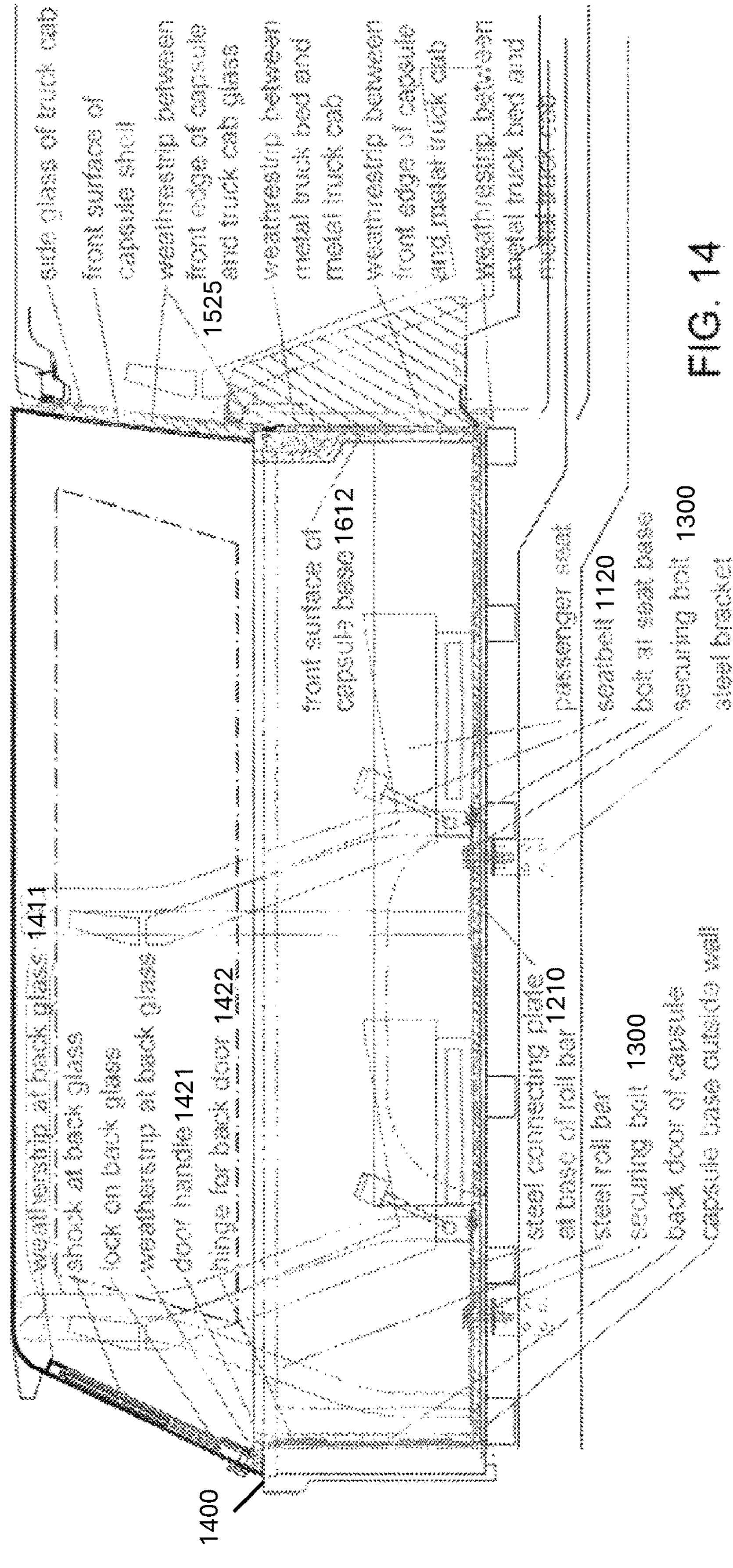
FIG. 14 is a side cross-section view of the truck bed with the capsule installed along section line 14-14 of FIG. 12C, showing the securement mechanism mating of capsule mounting mechanisms with frame brackets and establishment of the walk-through passage.

FIG. 14: Side Cross-Section (Frame Connection)

FIG. 14 is a side cross-section view of the truck bed (2200) with the capsule (1000) installed, taken along section line 14-14 of FIG. 12C. This view shows the profile relationship between the truck bed structure and the installed capsule.

The cross-section reveals the critical attachment of the capsule (1000) to the truck bed frame (2800). The securing mechanisms (1300)—typically in the form of heavy-duty bolts—penetrate the truck bed floor (2200) and engage with steel brackets (2810) that are permanently attached to the frame (2800).

The walk-through passage (1500) interface is visible in profile, showing how the cab wall (2110) projects down to meet the front surface of the capsule base. The seal between the cab structure and the capsule front face is maintained via weather strips (1531) at this interface.

The capsule base (1610) is shown resting on the truck bed floor (2200), with the capsule outside walls (1611) aligned with the truck bed sidewalls. The roll bar structure (1200) is depicted in the cross-section as a primary structural member spanning the width of the capsule interior.

Passenger seating (1100) is shown positioned within the capsule (1000) interior, with the seat attachment to the capsule floor (1110 bolts) clearly illustrated.

Use During SUV Mode Operation:

This cross-section demonstrates the robustness of the capsule attachment to the vehicle frame and the structural integration between the cab, bed, and capsule. The multi-point frame attachment ensures that crash loads and rollover forces experienced by the capsule are transmitted directly to the vehicle frame rather than to the truck bed floor, which is not designed to withstand such loads.

Figure 15:
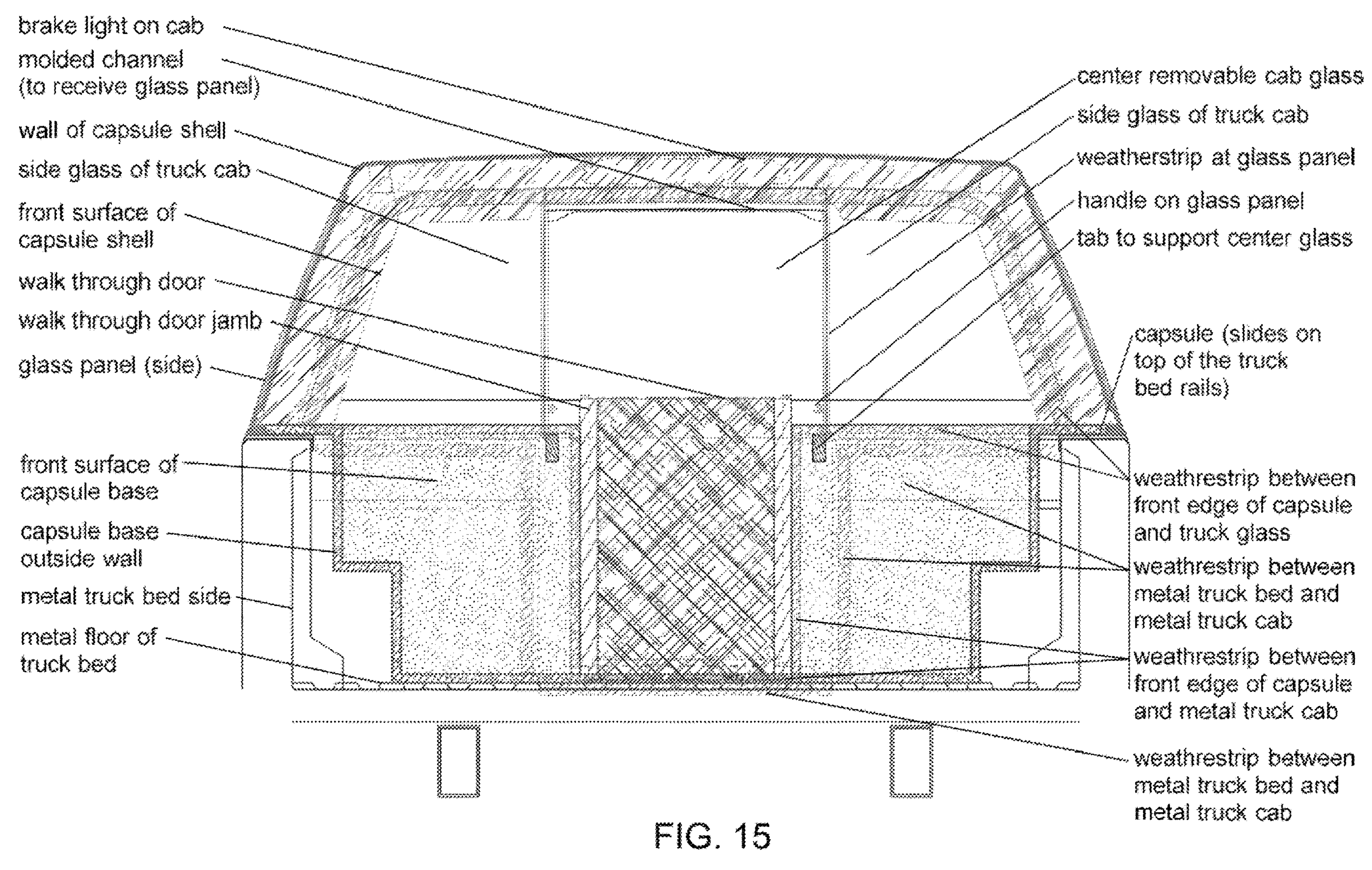
FIG. 15 is a cross-sectional view taken along section line 15-15 of FIG. 12C, illustrating the forward-looking view of the closed-door configuration walk-through passage connection between the cab and capsule.

FIG. 15: Walk-Through Passage Interface (Closed Configuration)

FIG. 15 is a cross-sectional view taken along section line 15-15 of FIG. 12C, showing a forward-looking (frontal) view of the closed-door configuration walk-through passage connection between the cab (2100) and capsule (1000).

This view reveals the precise alignment and sealing of the walk-through passage (1500) when the door (1510) is in the closed position and the center glass panel (1520) is installed. Although titled as showing the walk-through passage, this section may alternatively show the cross-section at a location where the passage is fully open, providing a clear view of the passage boundaries and overall dimensions.

The view shows the cab back wall (2110) and the forward-facing surface of the capsule (1000). The door jambs (1530) are visible as vertical structural members defining the left and right boundaries of the passage. The threshold (1511) is shown at the base of the passage, bridging between the cab floor and the capsule interior floor.

Weather strips (1531) are depicted at the interface between the door jambs (1530) and the door structure or capsule front face, ensuring that water and air infiltration are minimized. The weather strips are compressed into grooves or channels in the jambs (1530), creating a dynamic seal that accommodates thermal expansion and component tolerances.

Use During Transformation:

This section illustrates how the passage (1500) serves as the critical linkage between cab and capsule in SUV Mode. When the center glass (1520) and door (1510) are installed (Truck Mode), the same interface becomes a sealed, weather-proof rear window arrangement. The robust design of the door jambs (1530) ensures that the passage (1500) can accommodate repeated cycles of opening and closing without degradation of the seal integrity.

Figure 16:
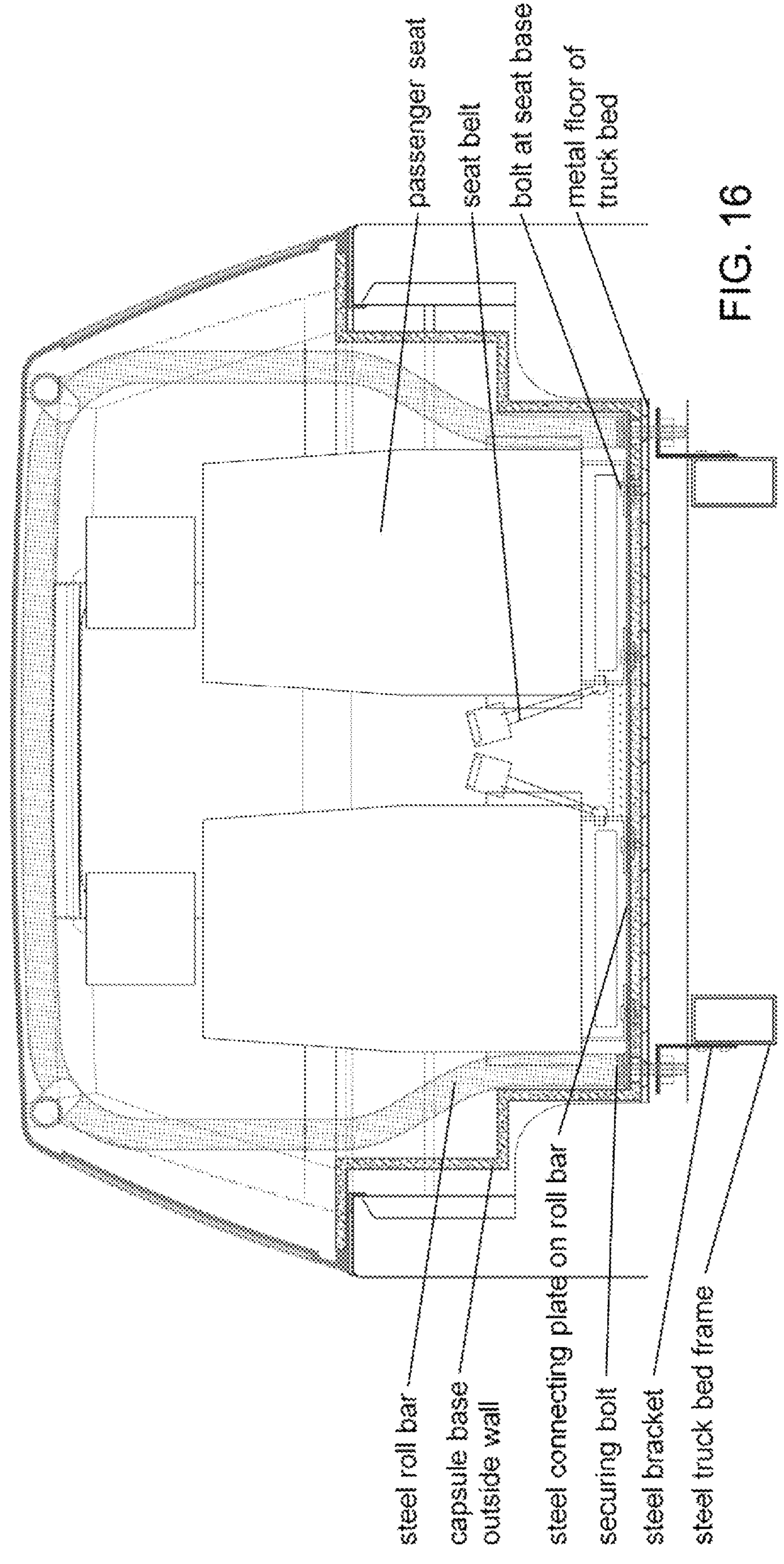
FIG. 16 is a cross-sectional view taken along section line 16-16 of FIG. 12C, illustrating the first pair of seating and associated roll bar structure and the direct front connection of the capsule through the truck bed to the vehicle frame.
Figure 17:
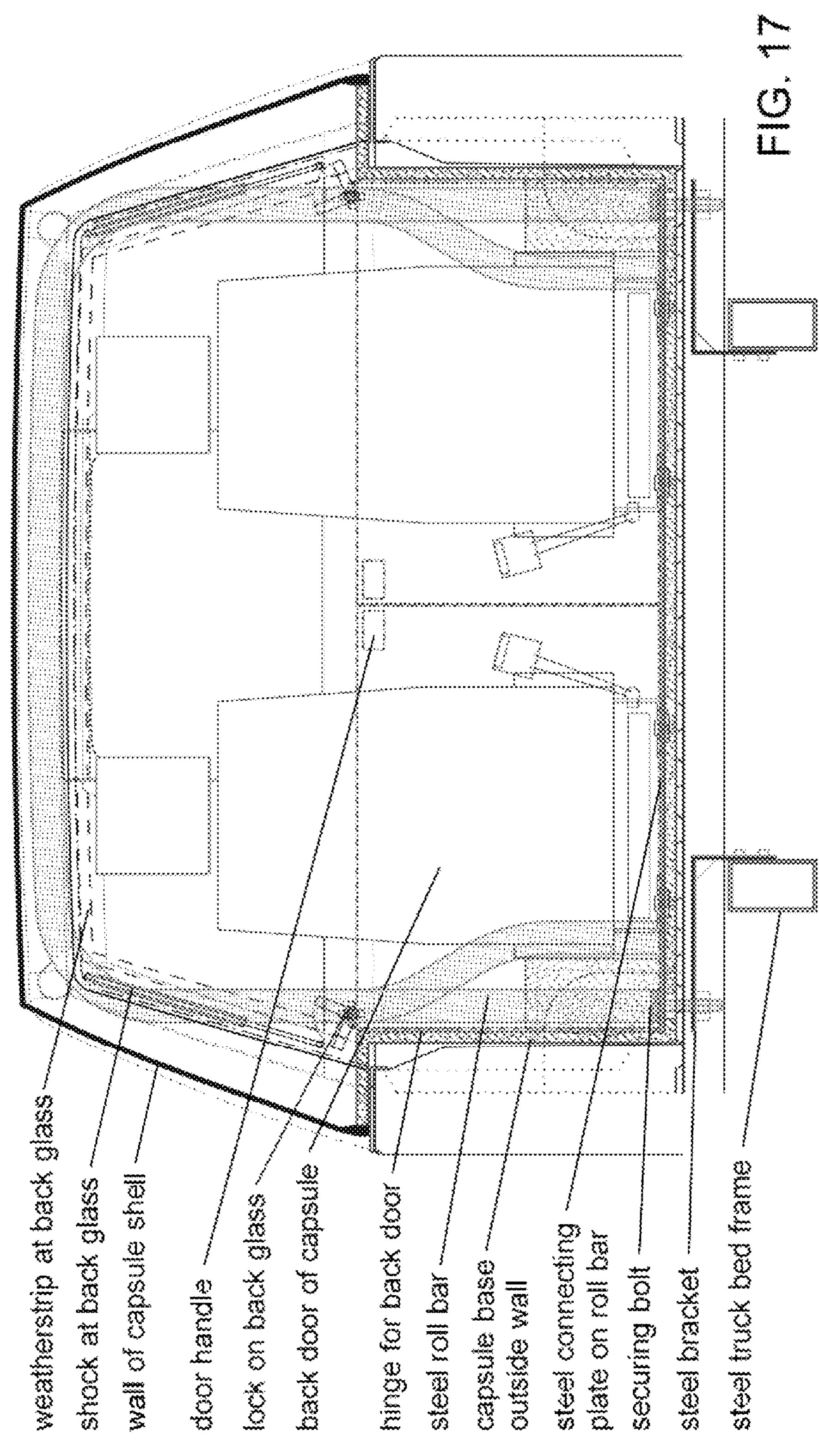
FIG. 17 is a cross-sectional view taken along section line 17-17 of FIG. 12C, illustrating the second pair of seating and associated roll bar structure, the direct rear connection of the capsule to the vehicle frame, and cargo doors.

FIGS. 16-17: Transverse Cross-Sections (Seating and Roll Bars)

FIG. 16 is a transverse cross-section (left-right orientation) taken along section line 16-16 of FIG. 12C. This view shows the interior of the capsule (1000) in cross-section, revealing the first pair of seating (1100) and the associated roll bar structure (1200). The view also shows the direct front connection of the capsule (1000) through the truck bed to the frame (2800) of the truck.

The first pair of seats (1100) is shown positioned side-by-side within the capsule (1000) interior. Each seat (1100) is mounted to the capsule floor via fasteners (1110 bolts), with the seats themselves equipped with three-point seat belts (1120) for occupant restraint. The seats are positioned to allow comfortable access from the walk-through passage (1500) area.

The roll bar (1200) is depicted as a horizontal structural member positioned above and behind the first pair of seats (1100). The roll bar (1200) is connected to the capsule structure via a connecting plate (1210) that interfaces with the capsule floor. The roll bar (1200) provides protection to occupants in the event of a vehicle rollover or lateral impact.

The capsule connection to the frame (2800) is shown via heavy-duty fasteners (1300) that penetrate the truck bed floor (2200) and engage with frame brackets (2810). This connection ensures that all crash loads are transferred directly to the vehicle frame rather than relying on the truck bed floor or sidewalls for structural support.

The exterior truck structure is shown in profile, including the truck bed sidewalls (2200), the truck bed frame (2800), and the related structural members. The integration of the capsule (1000) with the truck frame (2800) is clearly illustrated as a seamless structural connection.

Use During Crash or Rollover:

During a crash or rollover event, occupants in the first pair of seats (1100) are protected from side-impact forces by the roll bar (1200) and from vertical loads by the frame-anchored structure of the capsule. The direct connection to the frame (2800) ensures that protective structures remain intact and properly aligned, maintaining the space around occupants.

FIG. 17 is a transverse cross-section taken along section line 17-17 of FIG. 12C, depicting the second pair of seating (1100) and associated roll bar structure (1200), the direct rear connection of the capsule (1000) to the frame (2800), and the cargo doors (1400).

The second pair of seats (1100) is shown positioned side-by-side, mounted to the capsule floor with fasteners (1110). These rear seats (1100) provide additional passenger capacity and are positioned to allow reasonable access from the forward seats via the walk-through passage (1500), though access to the rear seats requires passenger movement through the capsule interior.

A roll bar (1200) associated with the rear seating area is depicted, providing occupant protection to the rear seat passengers. The roll bar (1200) is connected to the capsule structure via connecting plate (1210) and is anchored to the truck frame (2800) via fasteners (1300) and frame brackets (2810).

The cargo doors (1400) are shown at the rear of the capsule (1000). The doors (1400) provide access to storage space within or behind the rear seating area. The doors (1400) are typically hinged structures that swing outward when the truck tailgate (2300) is lowered, allowing cargo access without disrupting passenger seating.

The rear connection of the capsule (1000) to the frame (2800) is depicted, showing that the aft mounting points (1300) are as robust as the forward mounting points, creating a symmetric, multi-point attachment that resists twisting or differential motion.

Use During Cargo Access:

When cargo access is required, occupants can exit the capsule via the walk-through passage (1500) into the cab, or can directly access the cargo doors (1400) by lowering the truck tailgate (2300). The cargo door (1400) configuration allows internal storage without loss of passenger seating area or climate control in the main passenger cabin.

Figure 18:
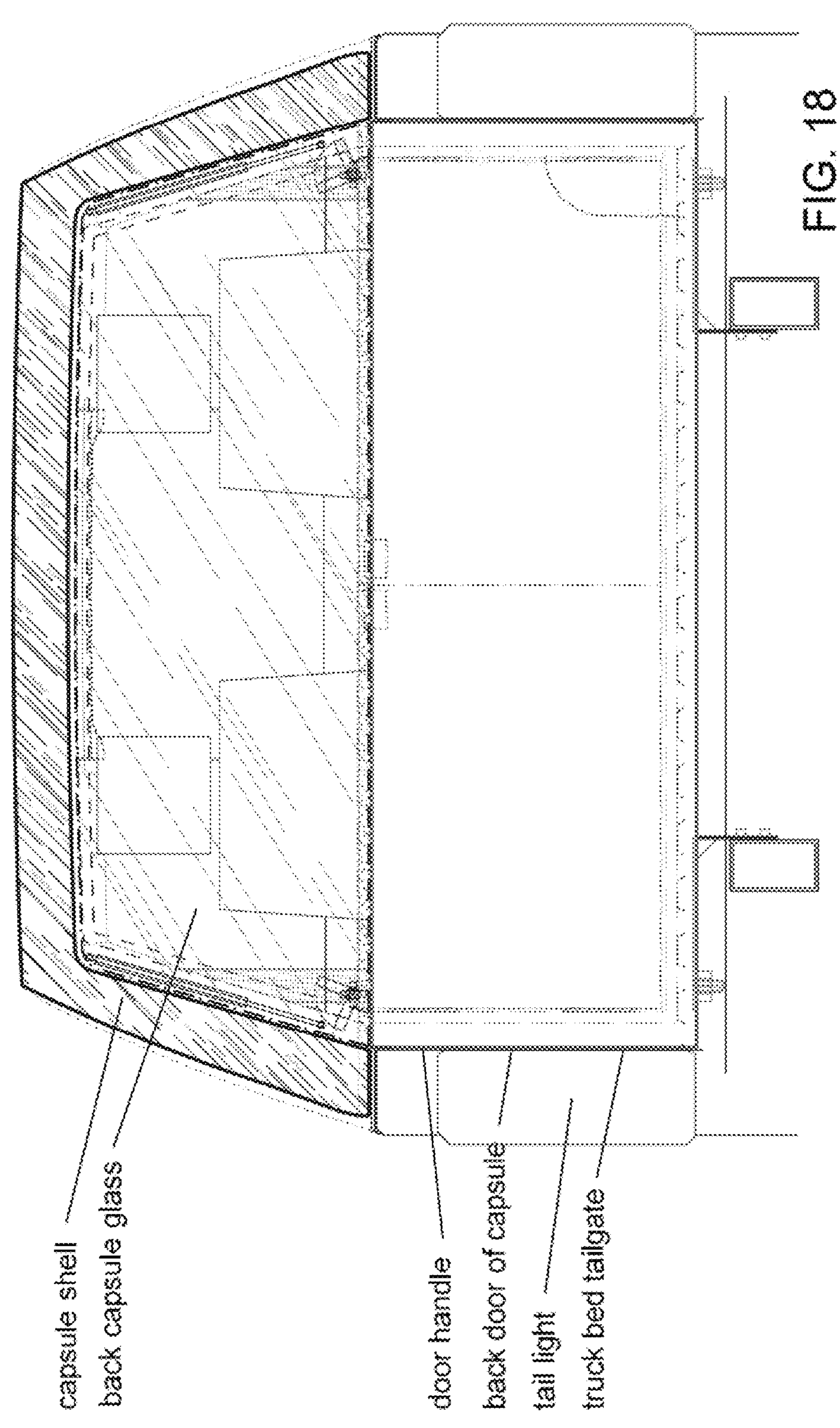
FIG. 18 is a plan view taken along section line 18-18 of FIG. 12C, showing the tailgate relationship with the capsule and illustrating the capsule lip riding on the top of the truck bed sidewalls and tailgate.

FIG. 18: Tailgate Interface and Capsule Lip

FIG. 18 is a plan view taken along section line 18-18 of FIG. 12C, showing the relationship between the truck tailgate (2300) and the installed capsule (1000). This view illustrates how the capsule lip (1621) rides on the top of the truck bed sidewalls and tailgate.

The capsule (1000) is designed with a lip structure (1621) that extends outward from the capsule base walls. When the capsule (1000) is installed, the capsule lip (1621) rests on the top edges of the truck bed sidewalls (2200) and on the top edge of the truck tailgate (2300). This interface provides both a mechanical support and a reference point for capsule positioning.

The truck tailgate (2300) is shown in its closed position beneath the rear edge of the capsule (1000). The tailgate (2300) remains operable and can be lowered to access the cargo doors (1400) of the capsule or to access cargo stored beneath or behind the capsule.

The capsule lip (1621) is dimensioned to fit precisely on the truck bed edges, preventing lateral shifting or vertical movement of the capsule (1000) due to rough road conditions or dynamic vehicle maneuvers. The lip (1621) is typically fabricated with a slightly resilient material (such as plastic or rubber) in the contact area to reduce vibration and noise while providing a secure grip on the bed edges.

Use During Dynamic Operation:

During vehicle operation over rough terrain or during high-speed maneuvers, the capsule lip (1621) contact with the truck bed edges prevents excessive movement or bouncing of the capsule. The combination of the lip (1621) support and the frame-anchor fasteners (1300) creates a stable, secure installation that minimizes noise and vibration transmission into the passenger compartment.

Figure 19:
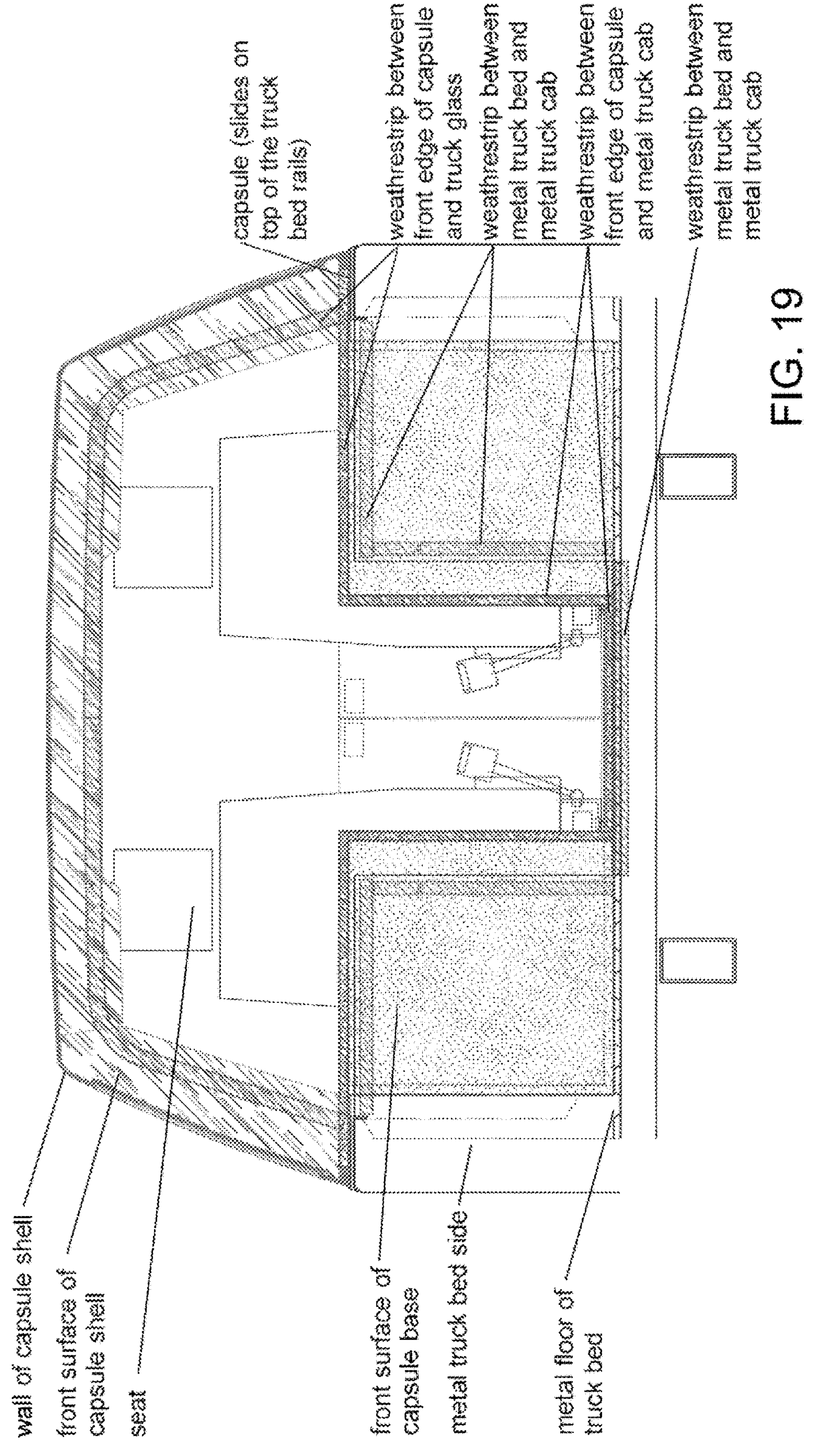
FIG. 19 is a cross-sectional view of the capsule and truck cab.
Figure 19A:
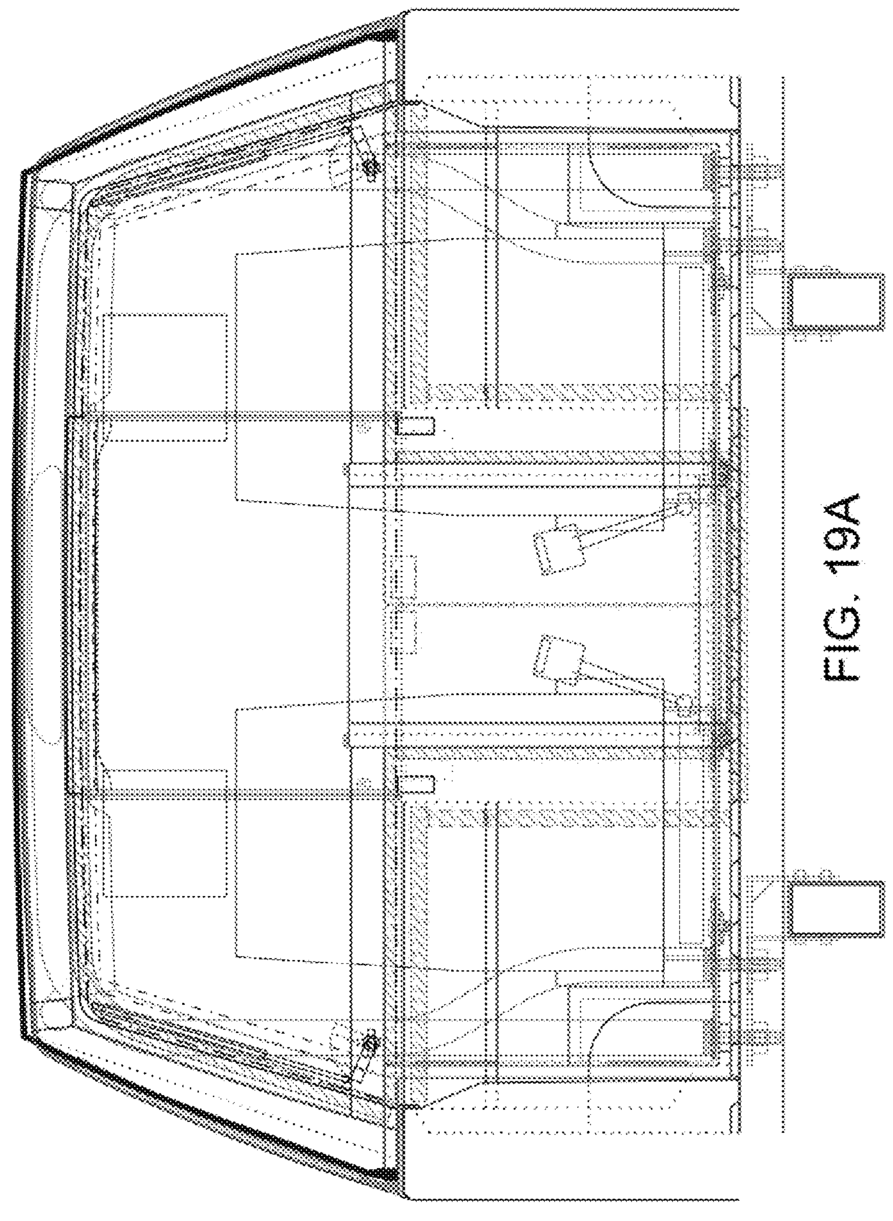
FIG. 19A is a cross-sectional view taken approximately along the interface of the capsule and truck cab (represented via section line 19-19 of FIG. 12C), illustrating the weather-proofed interface of the capsule and truck cab with the walk-through passage in an open configuration.
Figure 19B:
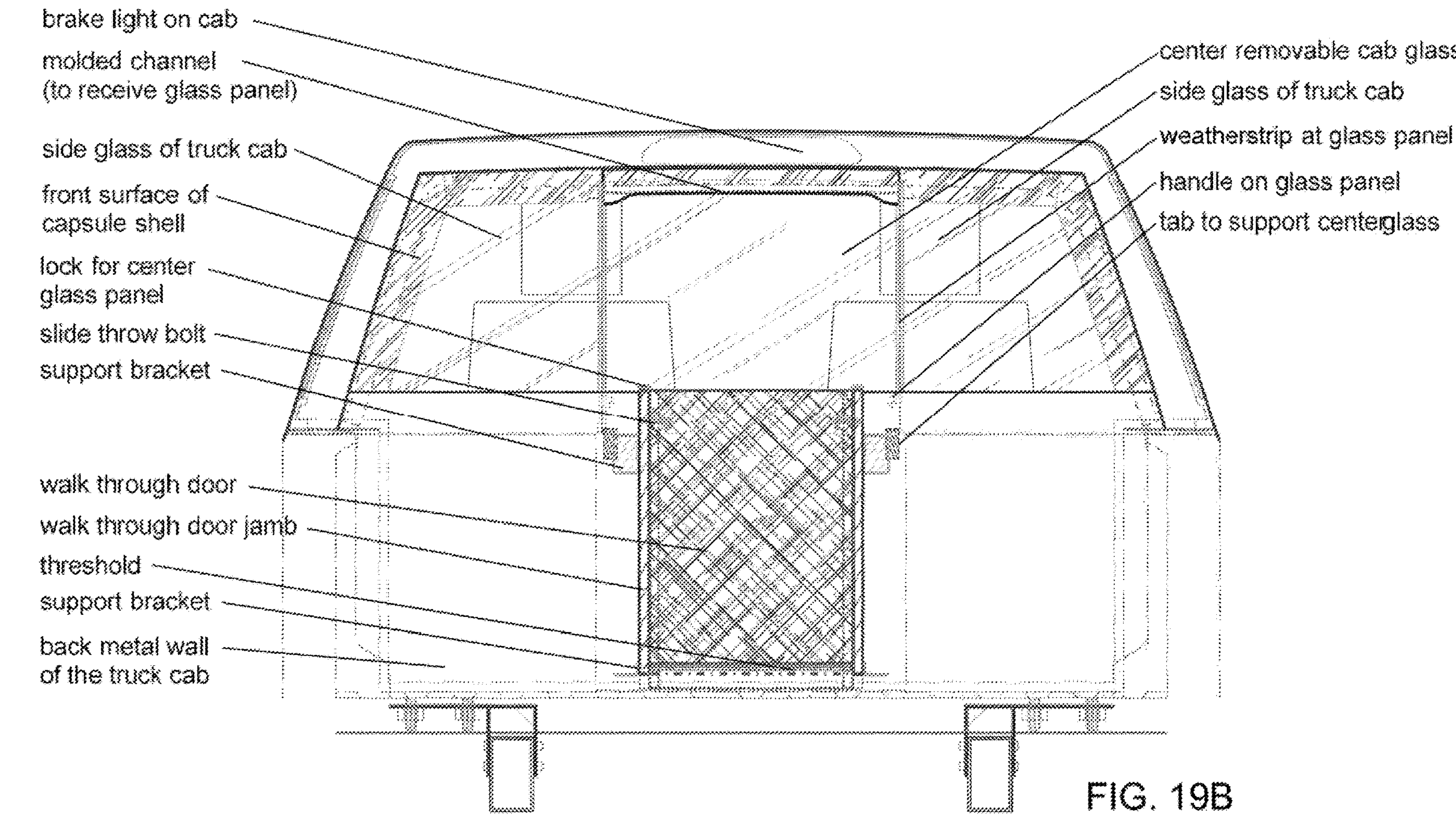
FIG. 19B is a cross-sectional view taken approximately along the interface of the capsule and truck cab (represented via section line 19-19 of FIG. 12C), illustrating the weather-proofed interface of the capsule and truck cab with the walk-through passage in a closed configuration.

FIGS. 19A-19B: Weather-Proof Interface (Open and Closed Configurations)

FIG. 19A is a transverse cross-sectional view taken approximately along the interface of the capsule (1000) and truck cab (2100), represented via section line 19-19 of FIG. 12C. This figure illustrates the weather-proofed interface between the capsule and truck cab when the walk-through passage (1500) is in the open configuration (Truck Mode being transformed to SUV Mode or fully in SUV Mode).

The view shows the cab back wall (2110) and the forward-facing surface of the capsule base front surface in cross-section. The passage opening is visible as an unobstructed opening between these two components. The door jambs (1530) are shown flanking the opening at the left and right.

The weather strips (1531) are positioned at the interface between the door jambs (1530) and the capsule front opening (1612). Even in the open configuration, these weather strips (1531) remain in compression, preventing rainwater that might be flowing down the cab back wall (2110) from entering the passage opening or the capsule interior.

The threshold (1511) is shown at the base of the opening, positioned at the interface between the cab floor and the capsule interior floor. The threshold (1511) includes weather-sealing features that prevent water from running from the cab floor into the capsule interior or vice versa.

The structural integrity of the opening is maintained by the door jambs (1530), which resist lateral loads and contribute to the overall structural stiffness of the cab-capsule interface. The jambs (1530) are welded or mechanically fastened to the cab structure at multiple points.

Use During SUV Mode Operation in Wet Weather:

During operation in rain or wet conditions with the passage in open configuration, water that accumulates on the cab roof drains down the back wall and around the door jambs (1530). The weather strips (1531) redirect this water away from the passage interior and down the outside of the vehicle body. The threshold (1511) is angled or contoured to shed water away from the interior.

FIG. 19B is a transverse cross-sectional view taken approximately along the same interface of the capsule (1000) and truck cab (2100), illustrating the weather-proofed interface when the walk-through passage (1500) is in the closed configuration (Truck Mode).

The view shows the cab back wall (2110) and the fully sealed walk-through passage assembly (1500). The walk-through door (1510) is installed between the door jambs (1530), creating a barrier between the cab interior and the truck bed exterior (or capsule interior if the capsule were still installed).

The center glass panel (1520) is installed above the door (1510), creating a transparent window appearance from both the cab interior and external perspectives. The glass panel (1520) is guided by the molded channel (1522) and is retained by tabs (1523).

The weather strips (1531) are positioned at the interface between the door jambs (1530) and the door (1510), providing a dynamic seal that accommodates component tolerances and thermal expansion. The weather strip material is compressed slightly during door installation, creating a positive pressure seal.

The threshold (1511) remains in place at the base of the door (1510), providing a step-over surface and contributing to the overall weatherproofing of the interface. Water that accumulates at the threshold level is directed away from the cab interior via slight contouring or channeling of the threshold surface.

Use During Truck Mode Operation in Wet Weather:

When the vehicle is in Truck Mode with the passage closed, the system functions as a conventional truck rear window. Water that accumulates on the roof drains down the back wall and around the window frame. The weather strips (1531) at the jamb-to-door and door-to-glass interfaces prevent water infiltration into the cab or truck bed interior. The closed-door configuration maintains the thermal enclosure of the cab, with heating and cooling systems functioning normally.

Operation During Transformation and SUV/Truck Mode Execution

Transformation Sequence: From Truck Mode to SUV Mode

Phase 1: Preparation

The operator parks the truck on level ground and engages the parking brake. The extended cab (2100) and truck bed (2200) are inspected to ensure clearance and proper positioning for capsule installation.

Phase 2: Truck Bed Preparation

The truck bed front wall segment (2210) is removed from the front of the truck bed (2200), exposing the closed walk-through passage assembly (1500) from the truck bed side. The walk-through door (1510) and center glass panel (1520) remain installed at this stage.

The truck tailgate (2300) is lowered to create an open rear for capsule insertion.

Phase 3: Capsule Positioning

The passenger capsule (1000) is transported to the truck using the loading apparatus (4000). The apparatus (4000) is positioned at the rear of the truck with the platform aligned with the truck bed floor level.

Phase 4: Walk-Through Configuration

The center glass panel (1520) is extracted by grasping the handle (1521) and pulling vertically, disengaging the panel (1520) from the molded channel (1522) and tabs (1523). The panel (1520) is stored in a secure location.

The walk-through door (1510) throw bolt (1513) is released, and the door (1510) is lifted vertically out of its position between the door jambs (1530). The door (1510) is stored in a secure location.

The passage (1500) is now completely open, ready to interface with the capsule (1000).

Phase 5: Capsule Installation

The passenger capsule (1000) is manually pushed (while walking down the alley of the apparatus (4000)) from the loading apparatus (4000) onto the truck bed floor (2200), with the capsule (1000) oriented to align the front opening (1612) with the door jambs (1530) and walk-through opening.

The capsule (1000) is positioned precisely to align the front opening (1612) with the door jambs (1530) and threshold (1511), creating a weather-proof interface. The capsule lip (1621) is seated on the top edges of the truck bed sidewalls (2200) and tailgate (2300).

Phase 6: Securing the Capsule

Heavy-duty fasteners (1300) are installed through pre-drilled holes in the capsule base (1610) and truck bed floor (2200), engaging with steel brackets (2810) attached to the truck bed frame (2800). The fasteners are tightened sequentially in a cross pattern to ensure even load distribution and proper alignment.

Phase 7: Verifying Alignment and Sealing

The operator visually inspects the alignment of the capsule (1000) with the door jambs (1530) and threshold (1511). The weather strip (1531) interface is verified to be in proper compression and seated correctly.

The operator manually attempts to move the capsule (1000) laterally and vertically to verify that the securing fasteners (1300) are tight and the capsule is immobilized.

Phase 8: System Verification

The operator tests the walk-through passage (1500) by physically walking from the cab (2100) through the threshold (1511) into the capsule interior. The operator verifies that no obstruction exists and that the passage is safe for passenger use.

The operator verifies that the vehicle structure exhibits no new squeaks, rattles, or unusual noises.

The truck is now in SUV Mode and ready for passenger operation.

Operation During SUV Mode

Passenger Ingress:

Passengers enter the vehicle through standard front doors of the extended cab (2100), positioning themselves in the front seats. Additional passengers then move through the walk-through passage (1500) into the capsule (1000) interior, seating themselves in the rear passenger seats (1100). Passengers in the rear positions use the seat belts (1120) to secure themselves.

Climate Control and Vehicle Systems:

With the capsule (1000) installed and the passage (1500) open, the cab and capsule interior spaces are integrated into a single thermal and acoustic environment. The vehicle heating and air conditioning systems operate to maintain temperature throughout both the cab and capsule, providing rear-seat passengers with climate control comparable to factory SUVs.

Passenger Communication:

Rear-seat passengers can communicate with front-seat occupants verbally without raising their voices significantly, as there is no barrier between the spaces. This facilitates normal conversation and allows rear passengers to interact with the driver regarding navigation or other vehicle management.

Vehicle Dynamics:

The capsule (1000), which is secured directly to the truck frame (2800) via fasteners (1300) and frame brackets (2810), moves as a unified structure with the truck during acceleration, braking, and cornering maneuvers. Occupants experience a driving experience comparable to a factory SUV or wagon vehicle.

Cargo Access:

Cargo can be accessed by lowering the truck tailgate (2300) and opening the capsule cargo doors (1400). The cargo doors (1400) swing outward to allow loading or unloading of luggage or other items without disrupting passenger seating in the capsule interior.

Exit from Capsule:

Passengers exit the capsule (1000) by walking through the walk-through passage (1500) in reverse, stepping over the threshold (1511), and exiting the truck through standard front doors.

Transformation Sequence: From SUV Mode to Truck Mode

Phase 1: Passenger Departure

All passengers exit the vehicle through the standard front doors and the walk-through passage (1500).

Phase 2: Capsule Preparation

The capsule securing fasteners (1300) are removed using appropriate tools, disengaging the capsule (1000) from the frame brackets (2810).

Phase 3: Capsule Removal

The capsule (1000) is manually pushed or pulled onto the loading apparatus (4000) positioned at the rear of the truck, reversing the installation procedure.

The apparatus (4000) is withdrawn from the truck, carrying the capsule (1000), and is repositioned to a storage location.

Phase 4: Walk-Through Closure

The walk-through door (1510) is positioned between the door jambs (1530) and secured via the throw bolt (1513).

The center glass panel (1520) is installed by sliding it upward into the molded channel (1522) and securing it via tabs (1523).

The weather strip (1531) is verified to be in proper compression.

Phase 5: Truck Bed Restoration

The truck bed front wall segment (2210) is installed at the front of the truck bed (2200), covering the walk-through passage assembly (1500) from the truck bed perspective.

The truck tailgate (2300) is closed and latched.

Phase 6: System Verification

The truck is inspected to verify that all components are secure and that no loose parts or fasteners remain. The vehicle now appears and functions as a standard pickup truck.

Phase 7: Truck Mode Operation

The vehicle can now be operated as a traditional pickup truck with full cargo bed utility. The frame brackets (2810) remain accessible for securing cargo directly to the truck frame.

Operation During Truck Mode

Cargo Loading:

Cargo is loaded into the truck bed (2200) through the open tailgate (2300). The truck bed front wall segment (2210) remains installed, separating the bed from the cab interior.

Frame-Mounted Cargo Securing:

Cargo is secured to the truck bed using the frame brackets (2810) accessible through the truck bed floor. Tie-down straps or chains are attached to the brackets (2810), anchoring cargo directly to the truck frame and providing security against cargo shifting.

Vehicle Operation:

The truck operates as a standard pickup truck during this phase. The closed walk-through passage (1500), with the door (1510) and center glass panel (1520) installed, provides a conventional rear window appearance.

Climate Control:

The vehicle heating and air conditioning systems maintain temperature in the extended cab (2100) alone, as the truck bed area is separate and not climate-controlled.

Cargo Access:

Cargo remains accessible by opening the tailgate (2300) without requiring passenger movement through interior spaces.

CONCLUSION

The transformable passenger transport system for pickup trucks provides a unique solution to the long-standing limitation of pickup trucks regarding passenger capacity. By combining a removable passenger capsule with a specialized walk-through passage assembly, the system allows rapid transformation between passenger and cargo modes while maintaining structural safety, weather-proofing, and vehicle utility.

The system's direct anchorage to the truck frame ensures that passenger safety is not compromised and that occupants benefit from protective structures equivalent to factory vehicles. The weather-sealing at the cab-capsule interface maintains thermal comfort and acoustic performance comparable to unibody vehicles. The reversibility of the system ensures that users are not permanently committed to either passenger or cargo operation, addressing a fundamental limitation of existing pickup truck modifications.

The present invention addresses and overcomes each identified deficiency in the prior art, providing a practical, reversible, safe, and market-ready solution to the challenge of combining pickup truck utility with SUV-like passenger capacity.

Moreover, towing a large motor home or travel trailer with a pickup truck imposes strict limits on passengers and luggage because every person, bag, and accessory in the truck counts against the truck's gross vehicle weight rating (GVWR), and the tongue or pin weight of the trailer (typically 10-15% of trailer weight) further reduces available payload capacity for occupants and cargo. In many real-world towing scenarios, the tongue weight plus the weight of truck occupants and gear quickly consume the available payload and approach rear axle capacity limits, effectively preventing the truck from carrying additional passengers or luggage even when the advertised tow rating has not been reached. By contrast, when the present passenger capsule is installed in the truck bed and secured directly to the truck frame via heavy-duty brackets, the capsule passengers' weight is distributed through a robust structural path and positioned forward in the bed near the cab interface, allowing better weight distribution across the truck's axles compared to passengers positioned farther rearward or riding in a towed vehicle. Additionally, when the capsule replaces a towed motor home or travel trailer as the primary passenger accommodation, the elimination of the trailer's tongue weight from the truck's payload calculation frees up substantial capacity for passengers and luggage within the integrated cab-and-capsule interior, allowing the system to operate more effectively within the manufacturer's weight ratings.

Finally, it should be noted that the present invention is particularly well-suited for heavy-duty pickup trucks—such as one-ton crew cab trucks with robust frame structures, reinforced suspensions, and substantial cargo bed capacity—where the capsule system's direct frame mounting, integrated roll bars, and multiple passenger seats provide optimal integration with the vehicle's existing load-carrying infrastructure. However, the modular architecture of the capsule and pass-through assembly is not inherently limited to heavy-duty platforms; the system is equally applicable to light-duty and mid-size pickup trucks, since the capsule mounts directly to the truck frame via brackets without requiring frame reinforcement or suspension modification, and the walk-through passage assembly integrates into the cab's rear wall through a removable structural interface that is dimensionally scalable to accommodate various cab configurations and bed lengths. Accordingly, while heavy-duty trucks represent the optimal use case where maximum structural margin and payload capacity provide the greatest advantage, the capsule system functions effectively across essentially any pickup truck classification, from compact and mid-size platforms to full-size light-duty vehicles, thereby providing transformable passenger transport capability to a broad spectrum of pickup truck owners.

Original claims submitted with this specification are incorporated by reference in their entirety.

I claim:

1. A method of transforming a pickup truck (2000) having a cab (2100) and a truck bed (2200) into a sport utility vehicle (SUV) equivalent passenger vehicle, the method comprising the steps of:

parking said pickup truck (2000) on level ground and engaging a parking brake;

removing a truck bed front wall segment (2210) from a front of said truck bed (2200) to expose a walk-through passage assembly (1500 installed in a rear wall (2110) of said cab (2100);

lowering a tailgate (2300) of said truck bed (2200 to create an open rear for a capsule insertion;

extracting a removable center glass panel (1520) by grasping a handle (1521) and pulling vertically to disengage said center glass panel (1520) from a molded channel (1522) and a plurality of tabs (1523);

releasing a slide-through bolt (1510) securing a walk-through door (1510) between a pair of door jambs (1530);

lifting said walk-through door (1510) vertically out of position between said door jambs (1530) to create an unobstructed passage opening;

providing a loading apparatus (4000) comprising a wheeled platform with a horizontal top surface, said loading apparatus (4000) being dimensioned to support a passenger capsule (1000);

positioning said loading apparatus (4000) at a rear of said pickup truck (2000) with said platform aligned with a level of a floor of said truck bed (2200);

placing said passenger capsule (1000) on said top surface of said loading apparatus (4000);

securing a connecting strap of said loading apparatus (4000) to said truck bed (2200) to prevent lateral drift during capsule transfer;

manually pushing said passenger capsule (1000) from said loading apparatus (4000) onto said truck bed floor while walking through a central alleyway provided in said loading apparatus (4000), said passenger capsule (1000) being oriented to align a front opening (1612) of said passenger capsule with said door jambs (1530) and said passage opening;

positioning said passenger capsule (1000) precisely to align said front opening (1612) with said door jambs (1530) and a threshold (1511) to create a weather-proof interface;

seating a capsule cover lip (1621) of said passenger capsule (1000) on top edges of truck bed sidewalls and said tailgate (2300);

installing a plurality of heavy-duty securing mechanisms (1300) through pre-drilled holes in a capsule base (1610) and through said truck bed floor to engage with steel brackets (2810) mounted directly to a steel truck bed frame (2800) underlying said truck bed;

tightening said securing mechanisms (1300) sequentially in a cross pattern to ensure even load distribution and rigid attachment of said passenger capsule (1000) to said truck bed frame (2800);

verifying alignment of said capsule front opening (1612) with said door jambs (1530) and said threshold (1511);

verifying that weather strips (1531) at said interface are in proper compression and seated correctly;

verifying unobstructed passage from said cab (2100) through said threshold (1511) into an interior of said passenger capsule (1000);

withdrawing said loading apparatus (4000) from said truck bed area and storing said loading apparatus for future use;

thereby transforming said pickup truck (2000) into an SUV-equivalent passenger vehicle wherein passengers can move seamlessly between said cab (2100) and said capsule interior through said walk-through passage assembly (1500), with said passenger capsule (1000) providing additional passenger seating (1100) equipped with seat belts (1120) and protected by roll bars (1200) anchored directly to said truck bed frame (2800).

* * * * *